US012632183B2

(12) United States Patent
Van der Goot et al.

(10) Patent No.: US 12,632,183 B2
(45) Date of Patent: *May 19, 2026

(54) CONFLICT-FREE PARALLEL RADIX SORTING DEVICE, SYSTEM AND METHOD

(71) Applicant: Achronix Semiconductor Corporation, Santa Clara, CA (US)

(72) Inventors: Marcel Van der Goot, Pasadena, CA (US); Raymond Nijssen, San Jose, CA (US); Christopher C. LaFrieda, Ridgefield, NJ (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/954,624

(22) Filed: Nov. 21, 2024

(65) Prior Publication Data

US 2025/0085860 A1      Mar. 13, 2025

Related U.S. Application Data

(63) Continuation of application No. 18/096,865, filed on Jan. 13, 2023, now Pat. No. 12,197,734.

(Continued)

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/0613; G06F 3/0659; G06F 3/0673; G06F 7/24
See application file for complete search history.

(56) References Cited

U.S. PATENT DOCUMENTS

| | | |
|---|---|---|
| 8,504,791 B2 | 8/2013 | Cheriton et al. |
| 8,825,566 B2 | 9/2014 | Jebara |

(Continued)

FOREIGN PATENT DOCUMENTS

| | | |
|---|---|---|
| WO | WO-2014108718 A1 | 7/2014 |
| WO | WO-2023244453 A1 | 12/2023 |

OTHER PUBLICATIONS

Z. Yu, Y. Yu, F. Tang and M. Guo, "A Register Framework for Network Processors with Banked Register File," 2009 International Conference on Complex, Intelligent and Software Intensive Systems, Fukuoka, Japan, 2009, pp. 607-613. (Year: 2009).*

(Continued)

*Primary Examiner* — Angelica Ruiz
(74) *Attorney, Agent, or Firm* — Schwegman Lundberg & Woessner, P.A.

(57) ABSTRACT

A conflict-free parallel radix sorting algorithm, and devices and systems implementing this algorithm, schedules memory copies of data elements of a large dataset so that there is always a single copy to each target memory each cycle of operation for the system implementing the algorithm. The conflict-free parallel radix sorting algorithm eliminates memory copying conflicts in copying data elements from different source memories to the same target memory and in this way maintains maximum throughput for the copying of data elements from source memories to target memories, reducing the time required to sort the data elements of the large dataset.

20 Claims, 29 Drawing Sheets

300

Related U.S. Application Data

(60) Provisional application No. 63/353,442, filed on Jun. 17, 2022.

(56) References Cited

U.S. PATENT DOCUMENTS

| | | | |
|---|---|---|---|
| 9,189,489 B1 * | 11/2015 | Harada | .............. G06F 16/24532 |
| 9,953,044 B2 * | 4/2018 | Bordawekar | ....... G06F 16/2237 |
| 10,375,160 B2 | 8/2019 | Li et al. | |
| 2005/0226214 A1 * | 10/2005 | Keslassy | ................. H04L 47/10 |
| | | | 370/351 |
| 2012/0066172 A1 | 3/2012 | Jebara | |
| 2013/0104251 A1 | 4/2013 | Moore et al. | |
| 2015/0212797 A1 * | 7/2015 | Bordawekar | ............. G06F 7/36 |
| | | | 707/753 |
| 2015/0331634 A1 | 11/2015 | Salishchev | |
| 2018/0276150 A1 | 9/2018 | Eckert et al. | |
| 2019/0034340 A1 * | 1/2019 | Doshi | ................. G06F 13/1668 |
| 2020/0136653 A1 | 4/2020 | Kim | |
| 2021/0117356 A1 | 4/2021 | Pugh et al. | |
| 2023/0409201 A1 | 12/2023 | Goot et al. | |

OTHER PUBLICATIONS

"U.S. Appl. No. 18/096,865, Examiner Interview Summary mailed Aug. 6, 2024", 2 pgs.

"U.S. Appl. No. 18/096,865, Non Final Office Action mailed Jun. 21, 2024", 11 pgs.

"U.S. Appl. No. 18/096,865, Notice of Allowance mailed Sep. 11, 2024", 9 pgs.

"U.S. Appl. No. 18/096,865, Response filed Sep. 3, 2024 to Non Final Office Action mailed Jun. 21, 2024", 12 pgs.

"International Application Serial No. PCT/US2023/024345, International Search Report mailed Oct. 11, 2023", 4 pgs.

"International Application Serial No. PCT/US2023/024345, Invitation to Pay Additional Fees mailed Jul. 26, 2023", 2 pgs.

"International Application Serial No. PCT/US2023/024345, Written Opinion mailed Oct. 11, 2023", 8 pgs.

Bashar, Romanous, "On the Acceleration of Database Primitives on FPGAs", University of California Riverside, (Sep. 2021), 1-130.

Merritt, Alexander, et al., "Efficient Programming of Massive-Memory Machines", Georgia Institute of Technology, (Dec. 2017), 1-145.

* cited by examiner

300

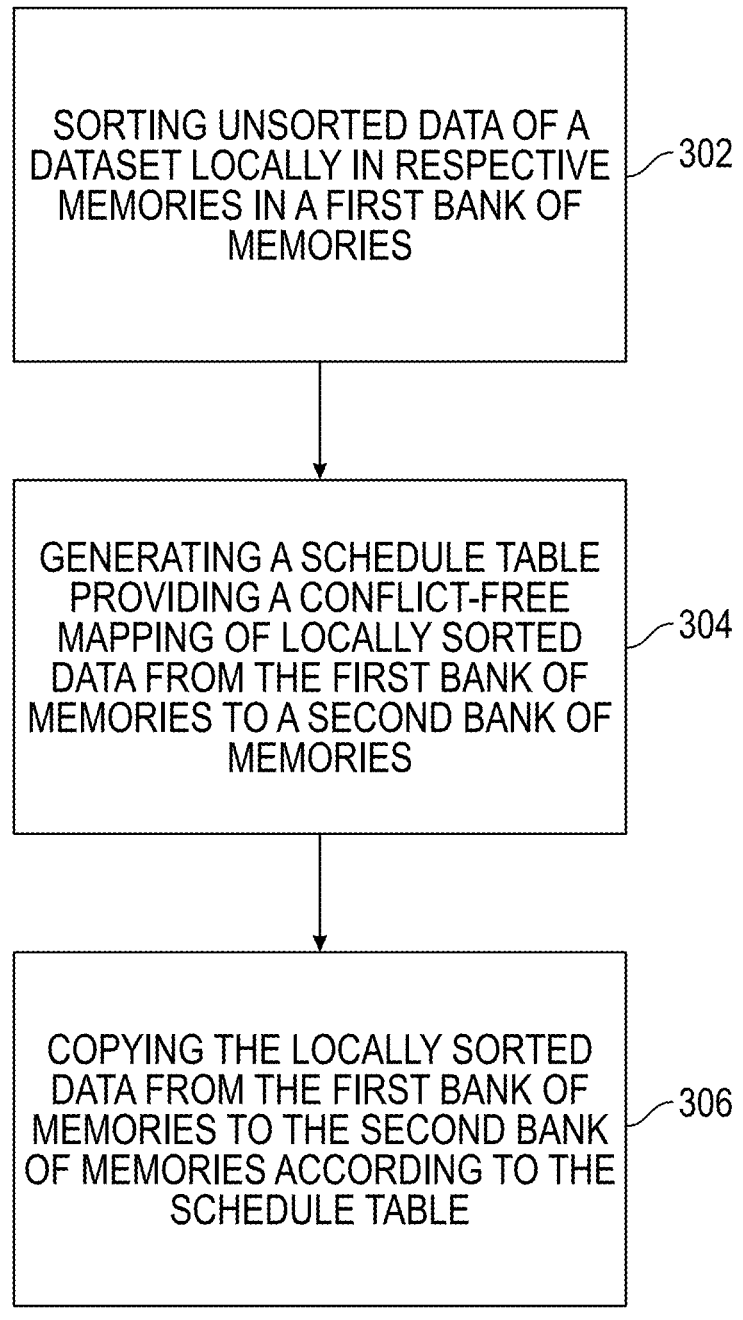

SORTING UNSORTED DATA OF A DATASET LOCALLY IN RESPECTIVE MEMORIES IN A FIRST BANK OF MEMORIES ⟋302

GENERATING A SCHEDULE TABLE PROVIDING A CONFLICT-FREE MAPPING OF LOCALLY SORTED DATA FROM THE FIRST BANK OF MEMORIES TO A SECOND BANK OF MEMORIES ⟋304

COPYING THE LOCALLY SORTED DATA FROM THE FIRST BANK OF MEMORIES TO THE SECOND BANK OF MEMORIES ACCORDING TO THE SCHEDULE TABLE ⟋306

| Key | Count (CNT) |
|-----|-------------|
| K0  | 0 | 1 |
| K1  | 1 | 2 |
| K2  | 2 | 2 |
| K3  | 3 | 1 |
| K4  | 4 | 0 |
| K5  | 5 | 2 |
| K6  | 6 | 1 |
| K7  | 7 | 3 |

OH

| Key | Offset (OFF) |
|-----|--------------|
| K0  | 0 | 0 |
| K1  | 1 | 1 |
| K2  | 2 | 3 |
| K3  | 3 | 5 |
| K4  | 4 | 6 |
| K5  | 5 | 6 |
| K6  | 6 | 8 |
| K7  | 7 | 9 |

FIG. 5

Memory B

| Addr | Key | Data |
|------|-----|------|
| 0 | | |
| 1 | | |
| 2 | | |
| 3 | | |
| 4 | | |
| 5 | | |
| 6 | 5 | d0 |
| 7 | | |
| 8 | | |
| 9 | | |
| 10 | | |
| 11 | | |

| Key | Offset |
|-----|--------|
| 0 | 0 |
| 1 | 1 |
| 2 | 3 |
| 3 | 5 |
| 4 | 6 |
| 5 | 6 7 |
| 6 | 8 |
| 7 | 9 |

HO

Memory A

| Addr | Key | Data |
|------|-----|------|
| 0 | 5 | d0 |
| 1 | 7 | d1 |
| 2 | 7 | d2 |
| 3 | 1 | d3 |
| 4 | 1 | d4 |
| 5 | 0 | d5 |
| 6 | 2 | d6 |
| 7 | 6 | d7 |
| 8 | 3 | d8 |
| 9 | 5 | d9 |
| 10 | 7 | d10 |
| 11 | 2 | d11 |

FIG. 6

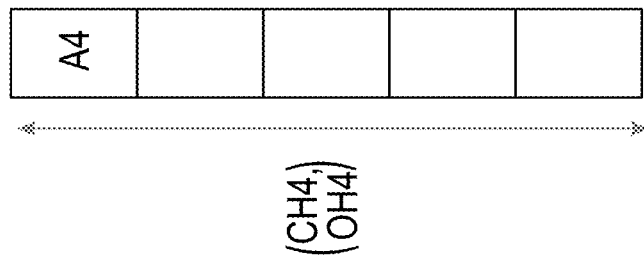
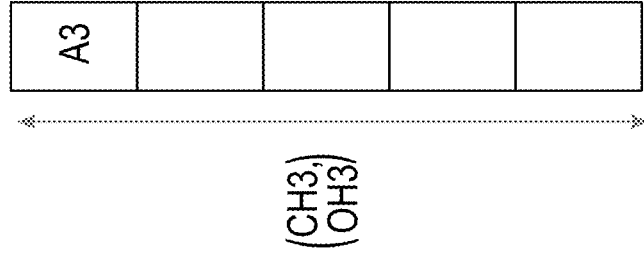
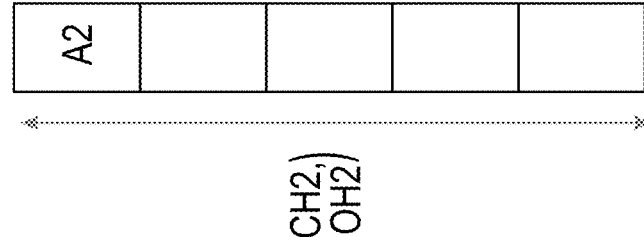
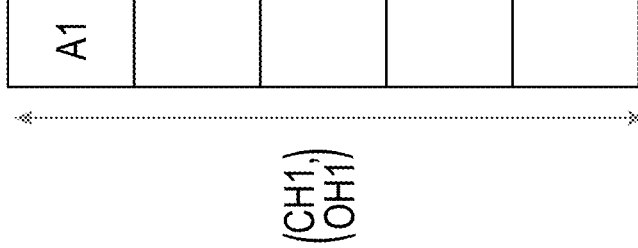
FIG. 9

| Addr | B1 | B2 | B3 | B4 |
|------|----|----|----|----|
| 0 | 0 | 0 | 0 | 0 |
| 1 | 1 | 2 | 2 | 0 |
| 2 | 1 | 2 | 2 | 0 |
| 3 | 2 | 3 | 4 | 2 |
| 4 | 2 | 4 | 4 | 2 |
| 5 | 3 | 5 | 5 | 3 |
| 6 | 5 | 5 | 6 | 4 |
| 7 | 5 | 5 | 6 | 5 |
| 8 | 6 | 6 | 6 | 6 |
| 9 | 7 | 7 | 6 | 7 |
| 10 | 7 | 7 | 7 | 7 |
| 11 | 7 | 7 | 7 | 7 |

GCQ

| Entry# | Source/Target Memory | | | | Size |
|---|---|---|---|---|---|
| | B1 | B2 | B3 | B4 | |
| 1 | A1 | A3 | A2 | A4 | 4 |
| 2 | A1 | A2 | A4 | A3 | 1 |
| 3 | A4 | A2 | A3 | A2 | 3 |
| 4 | A2 | A4 | A3 | A1 | 2 |
| 5 | A3 | A2 | A4 | A2 | 1 |
| 6 | A3 | A4 | A1 | A2 | 1 |

FIG. 16

SMH

| Target | Source Count | | | | Source Offset | | | |
|---|---|---|---|---|---|---|---|---|
| | B1 | B2 | B3 | B4 | B1 | B2 | B3 | B4 |
| A1 | 5 | 3 | 1 | 3 | 0 | 0 | 0 | 0 |
| A2 | 2 | 2 | 4 | 4 | 5 | 3 | 1 | 3 |
| A3 | 2 | 4 | 5 | 1 | 7 | 5 | 5 | 7 |
| A4 | 3 | 3 | 2 | 4 | 9 | 9 | 10 | 9 |

SMCH    SMOH

| A1 Target | A2 Target | A3 Target | A4 Target |
|---|---|---|---|

GSH

| Key | Count | | | | Offset | | | |
|---|---|---|---|---|---|---|---|---|
| | B1 | B2 | B3 | B4 | B1 | B2 | B3 | B4 |
| 0 | 1 | 1 | 1 | 3 | 0 | 1 | 2 | 3 |
| 1 | 2 | 0 | 0 | 0 | 6 | 8 | 8 | 8 |
| 2 | 2 | 2 | 2 | 2 | 8 | 10 | 0 | 2 |
| 3 | 1 | 1 | 0 | 1 | 4 | 5 | 6 | 6 |
| 4 | 0 | 1 | 2 | 1 | 7 | 7 | 8 | 10 |
| 5 | 1 1 | 3 | 1 | 1 | 11 | 1 | 4 | 5 |
| 6 | 1 | 1 | 4 | 1 | 6 | 7 | 8 | 0 |
| 7 | 3 | 3 | 2 | 3 | 1 | 4 | 7 | 9 |

GCH    GOH

FIG. 18

| Target Memory |
|:---:|
| A1 |
| A2 |
| A3 |
| A4 |

| Addr | A1 | A2 | A3 | A4 |
|:---:|:---:|:---:|:---:|:---:|
| 0 | 0 | 2 | 5 | 6 |
| 1 | 0 | 2 | 5 | 7 |
| 2 | 0 | 2 | 5 | 7 |
| 3 | 0 | 2 | 5 | 7 |
| 4 | 0 | 3 | 5 | 7 |
| 5 | 0 | 3 | 5 | 7 |
| 6 | 1 | 3 | 6 | 7 |
| 7 | 1 | 4 | 6 | 7 |
| 8 | 2 | 4 | 6 | 7 |
| 9 | 2 | 4 | 6 | 7 |
| 10 | 2. | 4 | 6 | 7 |
| 11 | 2 | 5 | 6 | 7 |

| | b1 | b2 | b3 | ⋮ | bM | |
|---|---|---|---|---|---|---|
| a1 | c(1,1) | c(1,2) | c(1,3) | ⋮ | c(1,M) | n |
| a2 | c(2,1) | c(2,2) | c(2,3) | ⋮ | c(2,M) | n |
| a3 | c(3,1) | c(3,2) | c(3,3) | ⋮ | c(3,M) | n |
| ⋮ | ⋮ | ⋮ | ⋮ | ⋮ | ⋮ | |
| aM | c(M,1) | c(M,2) | c(M,3) | ⋮ | c(M,M) | n |
| | n | n | n | n | n | |

FIG. 21

$$\sum_{i=1}^{M} C_{ij} = n$$

$$\sum_{j=1}^{M} C_{ij} = n$$

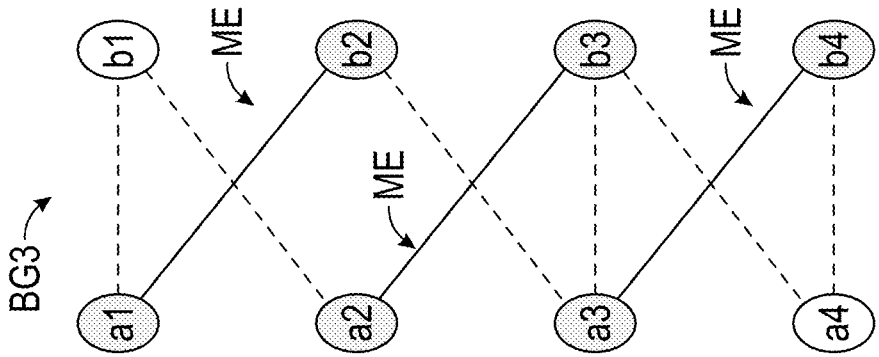
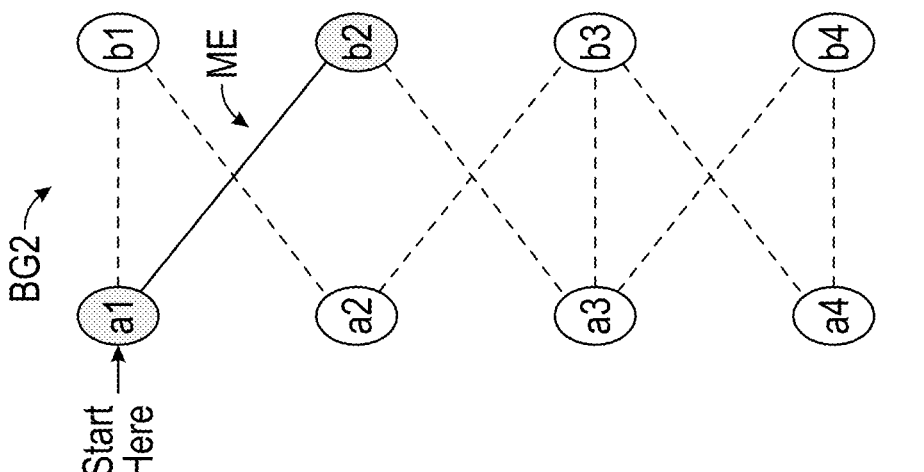
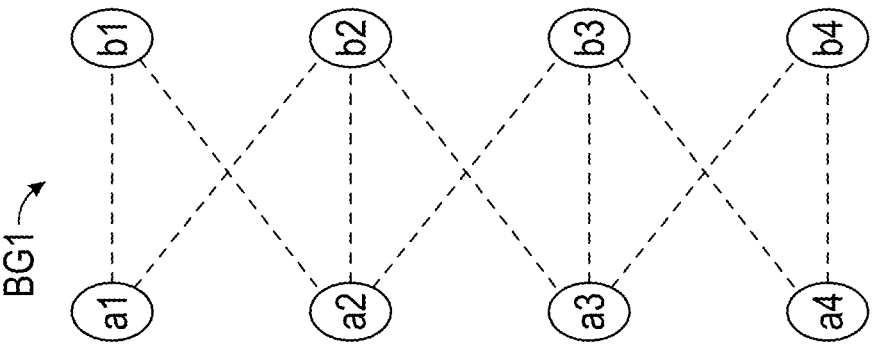
FIG. 24

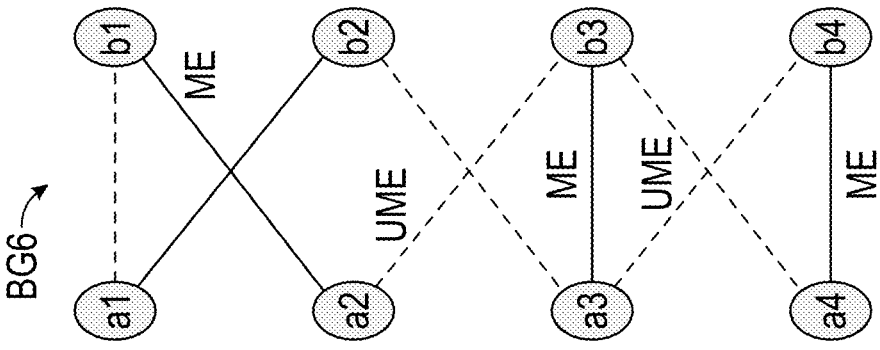
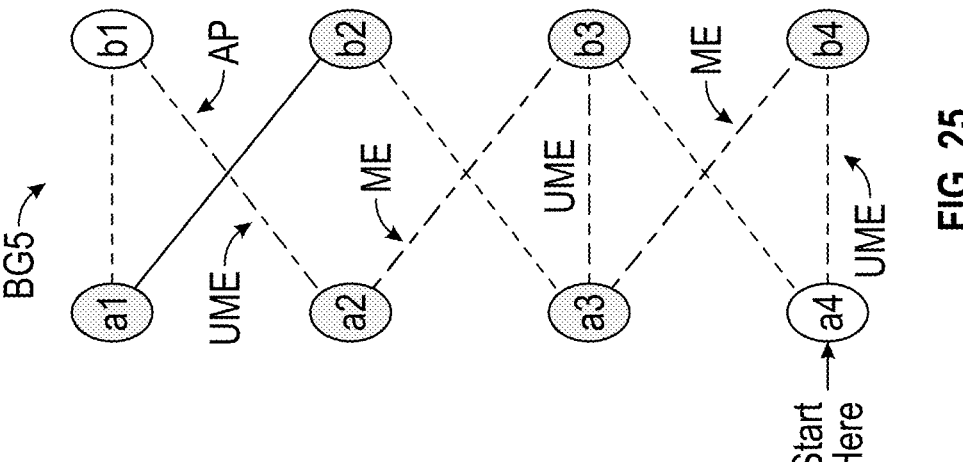
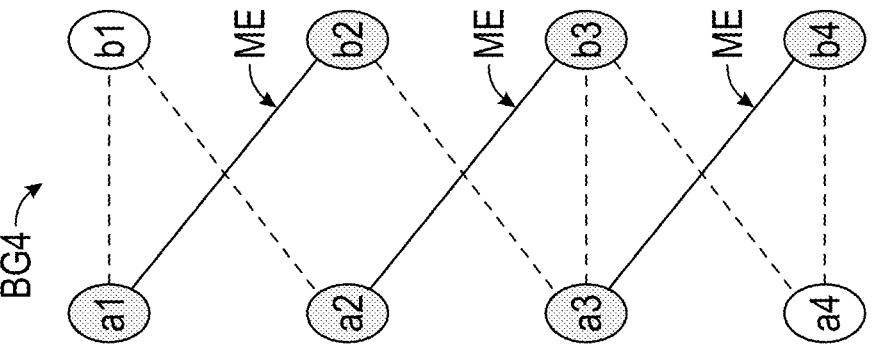
FIG. 25

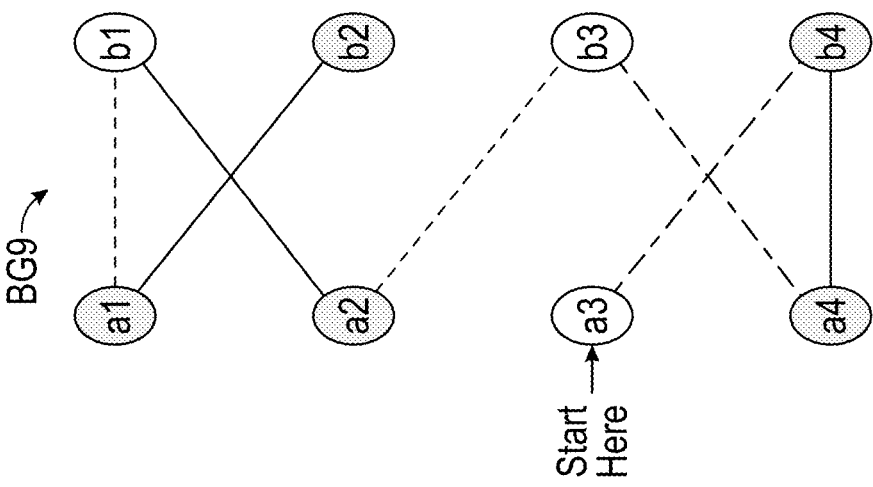
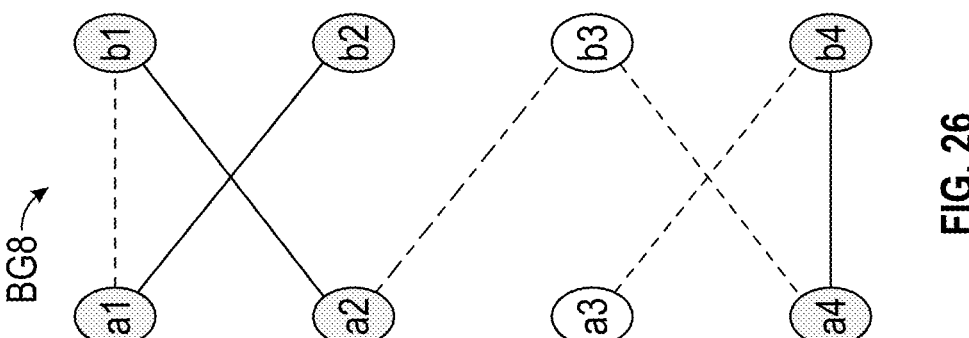
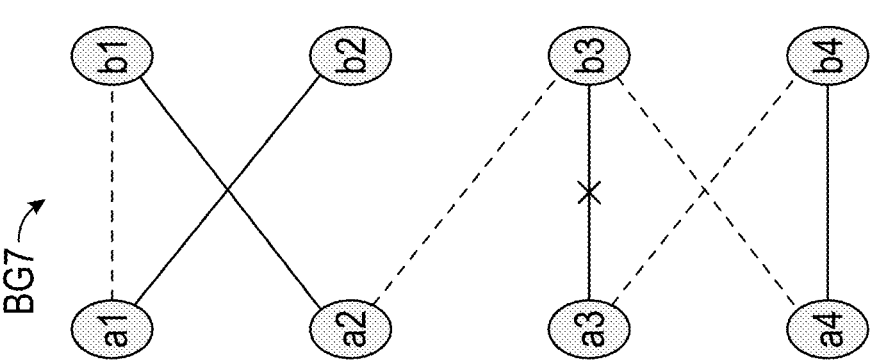
FIG. 26

2900

CONFLICT-FREE PARALLEL RADIX SORTING DEVICE, SYSTEM AND METHOD

PRIORITY APPLICATIONS

This application is a continuation of U.S. patent application Ser. No. 18/096,865, filed Jan. 13, 2023, which application claims the benefit of priority to U.S. Provisional Patent Application Ser. No. 63/353,442, filed Jun. 17, 2022, each of which are incorporated herein by reference in their entireties.

FIELD OF THE DISCLOSURE

This document pertains generally, but not by way of limitation, to methods, devices, and systems of sorting of data in a large dataset, and more particularly to conflict-free parallel sorting of large datasets to enable sorting in real-time applications where the sorting must be accomplished within a bounded time.

BACKGROUND

Various different types of systems, such as autonomous driving systems, generate large datasets including millions of data elements, or more, which need to be quickly sorted to enable proper operation of the system. Data elements in the dataset contain a corresponding key and data, which includes additional information associated with the data element. The data elements are sorted based on the value of the key for the element. The keys are not unique, with many data elements potentially sharing the same key. For real-time applications that are time sensitive, the sorting of these data elements must complete for the entire large dataset within a worst-case time to enable desired operation of the system.

In prior sorting implementations, the data elements of the large dataset are divided or split across a set of source memories, with a portion of the dataset being stored in each source memory. A separate set of target memories store the sorted data elements resulting from the sorting algorithm applied to the dataset. The sorting algorithm examines, in parallel, the data elements in each source memory and determines an address for each data element in the target memories such that copying data elements to these addresses in the target memories results in a sorted dataset. The algorithm performs, in parallel, copying of data elements from each source memory to the proper one of the target memories. A weakness or drawback of this approach is in this copying step of the algorithm since the algorithm may require copying multiple data elements to the same target memory at the same time. As a result, there will be copying conflicts that arise in copying the data elements from the source memories to the target memories. These copying conflicts result in copying of data elements to respective target memories being serialized, which of course delays the copying of all data elements to the target memories. In a worst-case scenario, for example, each source memory would simultaneously try to copy a data element to the same target memory, effectively negating the parallel operation of the algorithm and performing no better than serially copying the data element from each source memory to the target memory. Improved techniques for more quickly sorting data elements of a large dataset are accordingly needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Various ones of the appended drawings merely illustrate example embodiments of the present inventive subject matter and cannot be considered as limiting its scope.

FIG. 3 is a flowchart of an iteration of a conflict-free parallel radix sorting process implemented by the sorting system of FIG. 1 in accordance with some embodiments of the present disclosure.

FIGS. 4-7 illustrate operation of a counting sort that is performed as part of the local sorting of portions of a dataset in the process of FIG. 3 in accordance with some embodiments of the present disclosure.

FIGS. 8-10 illustrate the operation of a parallel radix-sort algorithm utilized in accordance with some embodiments of the present disclosure.

FIGS. 11-19 illustrate in more detail the operation of the conflict-free parallel radix sorting process of FIG. 3 in accordance with some embodiments of the present disclosure.

FIG. 21 illustrates the structure of a conflict-free schedule table in accordance with some embodiments of the present disclosure.

FIGS. 24-26 illustrate the algorithm implemented to identify conflict-free mappings for a conflict-free schedule table in accordance with some embodiments of the present disclosure.

DESCRIPTION

Embodiments of the present disclosure are directed to a conflict-free parallel radix sorting algorithm in which copies of data elements of a large dataset are scheduled so that there is always a single copy to each target memory each cycle of copying for the system. The scheduling algorithm eliminates memory copying conflicts where data elements from different source memories are to be copied to the same target memory and in this way maintains maximum throughput for the copying of data elements from the source memories to the target memories. Embodiments of the present disclosure are further directed to a scheduling algorithm, which may be implemented in hardware, with the scheduling algorithm guaranteeing the finding of a conflict-free scheduling for the copying of all data elements in the dataset. In a further embodiment, a method increases the parallelism of a traditional radix sort by overlapping the copying stage of one iteration of the radix sort with histogram generation of the next iteration of the radix sort.

Figure 1:
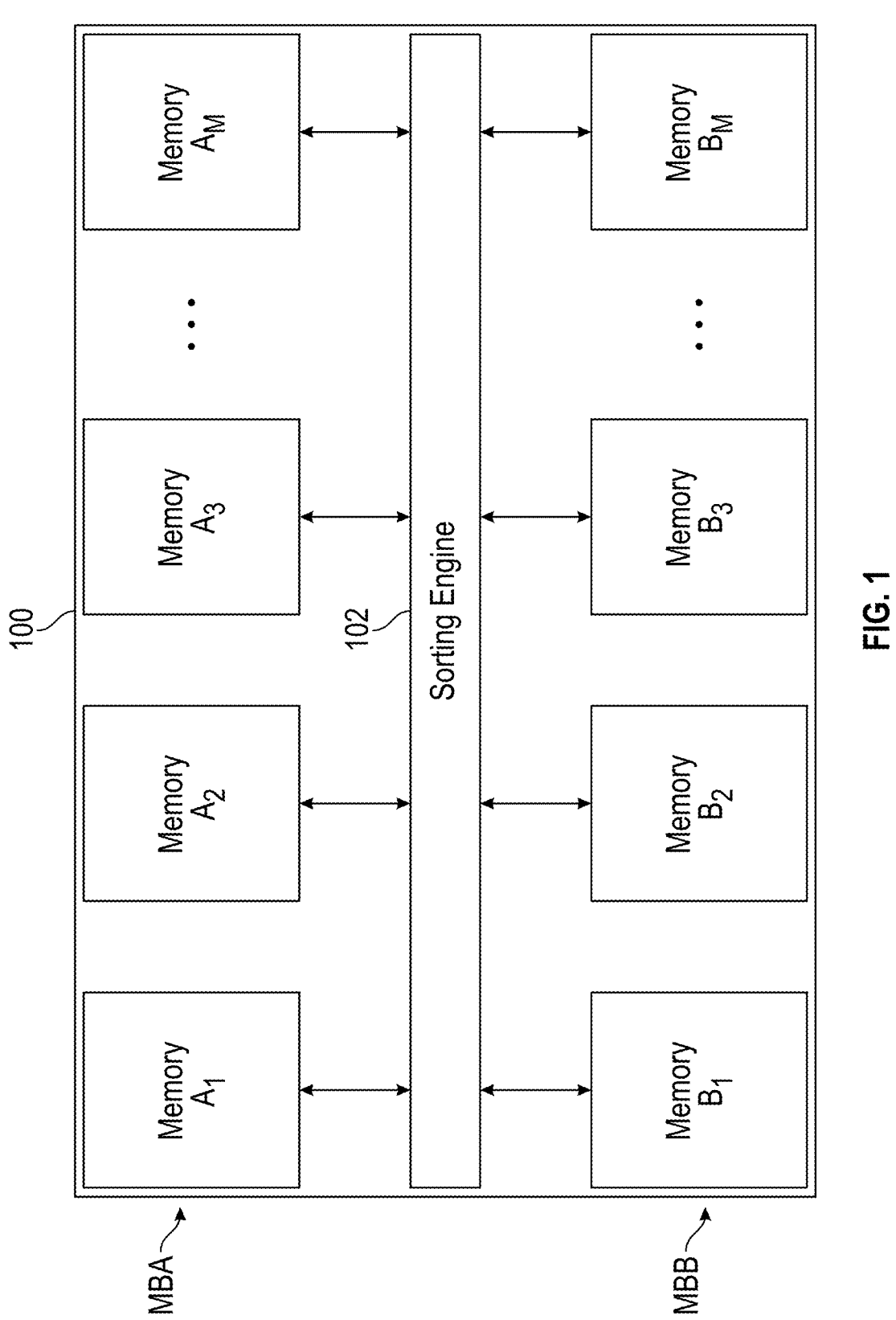
FIG. 1 is a functional block diagram of a conflict-free parallel radix sorting system in accordance with some embodiments of the present disclosure.

FIG. 1 is a functional block diagram of a conflict-free parallel radix sorting system 100 in accordance with one embodiment of the present disclosure. The conflict-free parallel radix sorting system 100 includes a sorting engine 102 that executes a conflict-free parallel radix sorting algorithm to sort data elements of a large dataset stored in a first bank of memory, MBA. The large dataset is divided or split across a plurality of individual memories $A_1$-$A_M$ forming the first bank of memory MBA, with a portion of the unsorted dataset being stored in each of the individual memories in the first bank of memory. A second bank of memory MBB also includes a plurality of individual memories $B_1$-$B_M$, and the sorting engine 102 transfers data elements between the first and second memory banks MBA, MBB during execution of the conflict-free parallel radix sorting algorithm, as will be described in more detail below.

In the present description, the individual memories $A_1$-$A_M$ of the first memory bank MBA and the individual memories $B_1$-$B_M$ of the second memory bank MBB may be referred to as either source memories or target memories. The roles of the memories $A_1$-$A_M$ and $B_1$-$B_M$ as either source or target memories will vary depending on whether the sorting engine 102 is executing a local sorting or a global sorting portion of the conflict-free parallel radix sorting algorithm, as will be described in more detail below. Also, in the present description the conflict-free parallel radix sorting algorithm executed by the sorting engine 102 of the sorting system 100 may simply be referred to as a conflict-free parallel radix sort.

In operation, the sorting engine 102 executes the conflict-free parallel radix sorting algorithm to determine the proper sorting of the unsorted data elements of the large dataset initially stored the memories $A_1$-$A_M$. The sorting engine 102 initially executes the local sorting portion of the conflict-free parallel radix sorting algorithm and copies unsorted data elements in each of the memories $A_1$-$A_M$ into a corresponding one of the memories $B_1$-$B_M$ to thereby store locally sorted data elements in each of the memories $B_1$-$B_M$. This portion of the conflict-free parallel radix sorting algorithm is termed the local sorting since unsorted data elements in each of the memories $A_1$-$A_M$ are copied only into a single one of the corresponding memories $B_1$-$B_M$. Thus, data elements in memory $A_1$ are copied only into memory $B_1$ to store these data elements as locally sorted data elements in the memory $B_1$. The same is done for the data elements in the other memories $A_2$-$A_M$, with data elements in memory $A_2$ being copied and stored as locally sorted data elements in memory $B_2$, data elements in memory $A_3$ being copied and stored as locally sorted data elements in memory $B_3$, and so on through the data elements in memory $A_M$ being copied and stored as locally sorted data elements in memory $B_M$. After the sorting engine 102 executes the local sorting portion of the conflict-free parallel radix soring algorithm, locally sorted data elements are stored in each of the memories $B_1$-$B_M$ in the second memory bank MBB.

Once the sorting engine 102 has completed the local sorting portion of the conflict-free parallel radix sorting algorithm, the sorting engine executes the global sorting portion of the algorithm in which the locally sorted data elements stored in the memories $B_1$-$B_M$ are sorted and copied into the memories $A_1$-$A_M$. The globally sorted data elements are the sorted set of all the unsorted data elements initially stored in the memories $A_1$-$A_M$. Thus, after the sorting engine 102 executes the global sorting portion of the conflict-free parallel radix soring algorithm, all the data elements in the large data set are stored as a sorted dataset in the memories $A_1$-$A_M$. The conflict-free parallel radix sorting algorithm eliminates copying or storage conflicts that arise in conventional parallel radix sorting algorithms when storing or copying the data elements between the memories $A_1$-$A_M$ and memories $B_1$-$B_M$. The local and global sorting portions of the conflict-free parallel radix sorting algorithm are performed multiple times or for multiple iterations on the data elements according to embodiments of the present disclosure. Each iteration of the conflict-free parallel radix sorting algorithm executes the local sorting and global sorting on respective sub-keys or radix of an overall key that is part of each of the data elements in the large dataset, as will be described in more detail below.

Figure 2A:
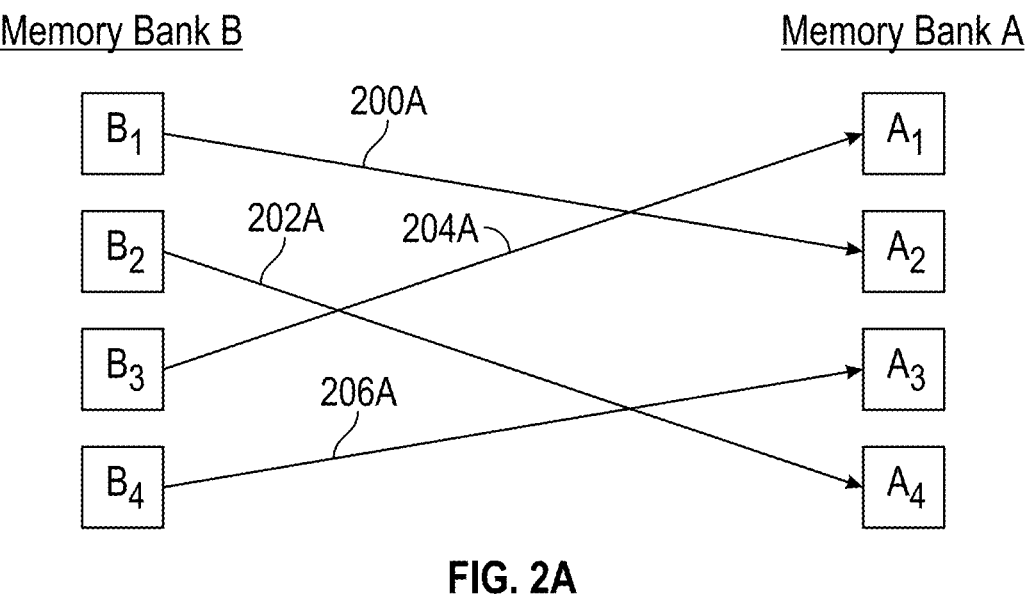
FIG. 2A illustrates conflict-free copying or storage implemented by the sorting system of FIG. 1 in accordance with some embodiments of the present disclosure.

FIG. 2A illustrates conflict-free copying or storage implemented by the sorting system of FIG. 1 in accordance with some embodiments of the present disclosure. In the example of FIG. 2A, the memory bank MBA includes four memories $A_1$-$A_4$ and memory bank MBB includes four memories $B_1$-$B_4$. During the copying or storage portion of the global sorting portion of the conflict-free parallel radix sorting algorithm, each cycle of operation of the algorithm a respective data element in each of the memories $B_1$-$B_4$ is copied into a corresponding one of the memories $A_1$-$A_4$. During the global sort portion of the conflict-free parallel radix sorting algorithm, the memories $B_1$-$B_4$ are source memories and the memories $A_1$-$A_4$ are target memories. FIG. 2A illustrates an exemplary cycle, with each of the arrows 200A-206A representing a storage or copying of a respective data element in one of the memories $B_1$-$B_4$ to a corresponding one of the $A_1$-$A_4$. Thus, in each cycle of operation of the conflict-free parallel radix sorting algorithm in the example of FIG. 2A, four data elements are copied in parallel into the four target memories $A_1$-$A_4$. Only one data element in each source memory $B_1$-$B_4$ may be copied into only one of the corresponding target memories $A_1$-$A_4$ each cycle, as will be appreciated by those skilled in the art. FIG. 2A illustrates a simplified example of one cycle of operation, and the algorithm repeats this type of copying operation over as many cycles as required during the global sorting to copy locally sorted data elements in each of the source memories $B_1$-$B_4$ to the target memories $A_1$-$A_4$ and thereby store the globally sorted data elements in the target memories $A_1$-$A_4$.

Figure 2B:
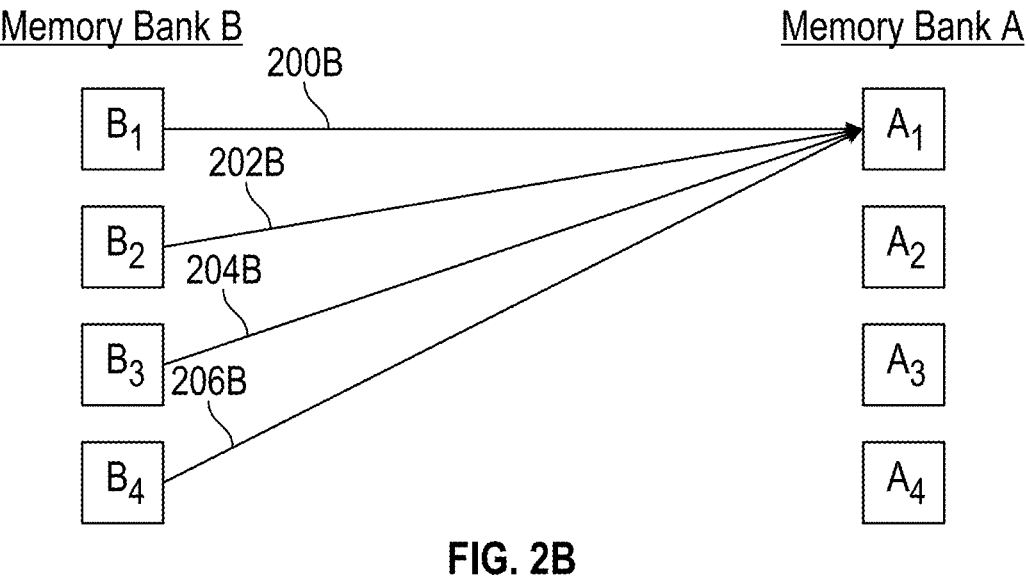
FIG. 2B illustrates copying conflicts that arise in conventional parallel radix sorting systems and which are avoided by the conflict-free parallel radix sorting system of FIG. 1 in accordance with some embodiments of the present disclosure.

FIG. 2B illustrates copying conflicts that arise in conventional parallel radix sorting algorithms, which are avoided by the conflict-free parallel radix algorithm in accordance with some embodiments of the present disclosure. In the example of FIG. 2B, during the illustrated cycle each of the source memories $B_1$-$B_4$ needs to copy a data element into the same target memory $A_1$, as represented by arrows 200B-206B. As mentioned above, only a single data element from a single source memory $B_1$-$B_4$ may be copied into each target memory $A_1$-$A_4$ during each cycle. The example copying conflict of FIG. 2B necessitates the copying of the required data elements in the source memories $B_1$-$B_4$ to be serialized. As a result, the conventional parallel radix sorting algorithm requires four cycles of operation to copy the required data elements from the source memories $B_1$-$B_4$ to the target memory $A_1$ in this situation. These storage or copying conflicts that arise in conventional parallel radix sorting algorithms slow down the copying of all data elements in the source memories $B_1$-$B_4$ into the target memories $A_1$-$A_4$ since more cycles are required to copy all the data elements. This is in contrast to the conflict-free parallel radix sorting algorithm according to embodiments of the present disclosure, which ensures four data elements (in the example of FIG. 2A) are copied each cycle of operation such that a minimum number of cycles and therefore a minimum time is required to copy all the data elements from the source memories $B_1$-$B_4$ to the target memories $A_1$-$A_4$.

FIG. 3 is a flowchart of one iteration of a conflict-free parallel radix sorting algorithm or process 300 implemented by the sorting system 100 of FIG. 1 in accordance with some embodiments of the present disclosure. The process 300 begins with a local sorting operation 302 in which the algorithm performs a local sorting operation of the unsorted data elements stored in the memories $A_1$-$A_M$. As used in the present description and as briefly discussed above, "local sorting" of data means the data elements stored in each of the memories are individually sorted. In the local sorting operation 302, the memories $A_1$-$A_M$ are the source memories and store unsorted data elements of the dataset being sorted. In operation 302, the sorting system 100 sorts the unsorted data elements of a dataset stored in each of the source memories $A_1$-$A_M$ in the corresponding one of the memories $B_1$-$B_M$, which are the target memories during the local sorting operation 302. The local sorting operation 302 utilizes a sorting algorithm to locally sort the data elements in the respective memories $A_1$-$A_M$ in the corresponding one of the memories $B_1$-$B_M$. The data elements are termed "locally sorted" herein since the unsorted data elements stored in each of the source memories $A_1$-$A_M$ is individually sorted and stored in the corresponding one of the target memories $B_1$-$B_M$ in the local sorting operation 302. Thus, the data elements of the overall dataset stored collectively in the memories $A_1$-$A_M$ are not sorted during the operation 302. Instead, the data elements stored in memory $A_1$ are sorted and stored in memory $B_1$, data elements in memory $A_2$ are sorted and stored in memory $B_2$, and so on through the data elements in memory $A_M$ being sorted and stored in memory $B_M$. In embodiments of the present disclosure, the operation 302 locally sorts the data elements stored in each of the source memories $A_1$-$A_M$ in the corresponding target memory $B_1$-$B_M$ through a counting sort, as will be described in more detail below with reference to FIGS. 4-7. Thus, after the local sorting operation 302, the locally sorted data elements are stored in the memories $B_1$-$B_M$.

Once the data elements have been locally sorted in operation 302, the process 300 proceeds to a scheduling operation 304 and generates a schedule table that provides a conflict-free mapping of the locally sorted data elements in the memories $B_1$-$B_M$ to the memories $A_1$-$A_M$ in the memory bank MBA. This conflict-free mapping defines the order in which locally sorted data elements in the memories $B_1$-$B_M$ are to be copied into the memories $A_1$-$A_M$ so that all the data elements of the dataset are properly sorted in the memories $A_1$-$A_M$ after all data elements have been copied. The conflict-free mapping of the schedule table ensures that copying conflicts, as described above with reference to FIGS. 1 and 2B, do not arise when copying the locally sorted data elements in the memories $B_1$-$B_M$ into the memories $A_1$-$A_M$.

After generation of the schedule table in operation 304, the process 300 proceeds to a memory copying operation 306 and copies the locally sorted data elements from the memories $B_1$-$B_M$ to the memories $A_1$-$A_M$ according to the schedule table to thereby store the sorted dataset of all data elements in the memories $A_1$-$A_M$. The memory copying operation 306 may also be referred to as a global sorting operation or as a global sorting portion of the conflict-free parallel radix sorting algorithm in the present description. The conflict-free copying resulting from the conflict-free parallel radix sorting algorithm 300 reduces the number of cycles required to copy all the data elements from the $B_1$-$B_M$ to the memories $A_1$-$A_M$. In this way, the conflict-free parallel radix sorting algorithm 300 reduces the time required to obtain the sorted dataset (i.e., the properly sorted data elements) stored in the memories $A_1$-$A_M$. This reduced time makes the conflict-free radix parallel sorting algorithm well suited to utilization in applications, such as autonomous driving systems, involving very large numbers of data elements that must be sorted very quickly to enable operation of the system. The conflict-free parallel radix sorting algorithm also enables sorting of the large dataset with only the two banks of memory MBA, MBB including the memories $A_1$-$A_M$ and $B_1$-$B_M$ by copying between the memories in these two banks. This is advantageous compared to in-place sorting techniques that are significantly more expensive in terms time required to perform the sort.

FIGS. 4-7 illustrate operation of a counting sort that is performed as part of the local sorting performed in the operation 302 of the process 300 of FIG. 3 in accordance with some embodiments of the present disclosure. The counting sort will be understood by those skilled in the art and will accordingly not be described in detail herein, but will only be described to the extent necessary to enable an understating of the operation of the conflict-free parallel radix sorting algorithm according to embodiments of the present disclosure. In the present description, where more than one of a given component exists, the components are typically referred to using a reference letter followed by a reference number. For example, the memories A1-A4 and memories B1-B4 as discussed above. When referring to a specific one or ones of the components both the reference letter and reference number will be utilized (e.g., A1, B3) while only the reference letter (e.g., A, B) will be utilized when referring to any or all of the components.

FIGS. 4-7 illustrate a simple example of a counting sort algorithm that is executed to locally sort data elements DE stored in one of the memories $A_1$-$A_M$ of FIG. 1 during execution of the conflict-free parallel radix sorting algorithm 300 of FIG. 3. The locally sorted data elements from the counting sort algorithm are stored in a corresponding one of the memories $B_1$-$B_M$. During execution of the counting sort algorithm to locally sort the data elements DE, the memories $A_1$-$A_M$ are source memories and the memories $B_1$-$B_M$ are target memories. The counting sort algorithm sorts the data elements DE based on the key K of each data element. In the example of FIGS. 4-7, unsorted data elements DE0-DE11 are stored in a memory A. In this simplified example, the memory A has twelve storage locations ADDR0-ADDR11, with each storage location being individually addressable to enable a data element DE to be written into or read from the storage location. The memory A stores twelve data elements DE0-DE11, each data element including a key K along with data d0-d11. The keys K of the data elements DE0-DE11 are not unique, with multiple data elements having the same value for the key K. The key K of each data element DE has eight possible values 0-7 in the simplified example of FIGS. 4-7 and each of these keys is designated K0-K7 in the present description.

Figure 4:
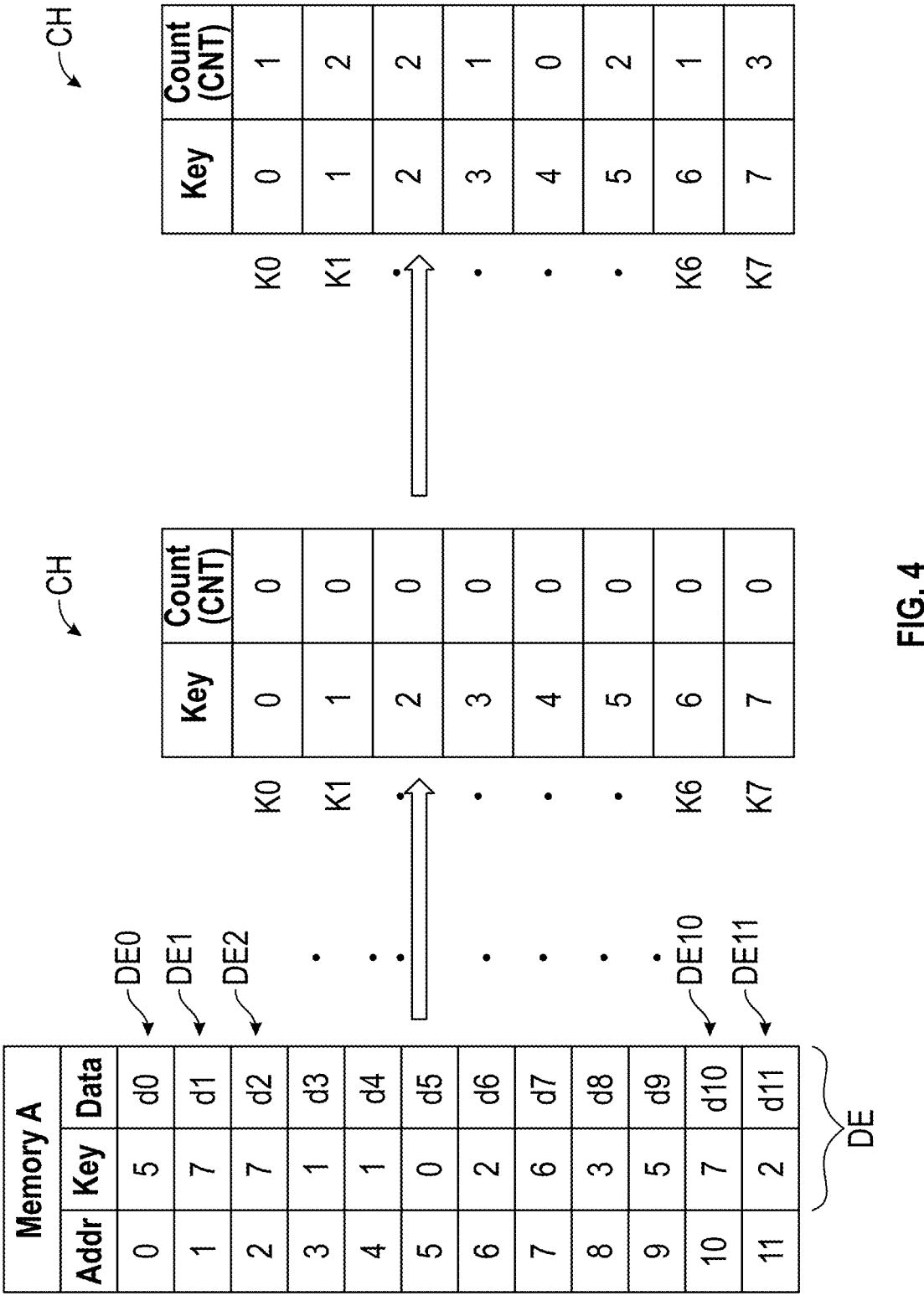

FIG. 4 illustrates the unsorted data elements DE0-DE11 stored in the memory A on the left of the figure. The first step in the counting sort algorithm is to generate a count histogram CH of a count CNT for each key K of the data elements DE. This initial count histogram CH is shown in FIG. 4. The count histogram CH is generated having a number of rows that is equal to the number of potential values for the keys K of the data elements DE. Thus, in the example of FIG. 4 the count histogram CH has eight rows, one for each the eight key values 0-7 of keys K0-K7. Each row of the histogram accordingly has a corresponding value for the key K and a count CNT associated with the key, with the counts being initialized to zero as seen in the count histogram CH in the center of FIG. 4. The data elements DE stored in the memory A are then accessed to count the occurrences of each key K for the dataset of all the data elements. The specific time the keys K of the data elements DE are counted may vary in different embodiments, and in one embodiment the keys K are counted as the data elements DE of a new dataset are being loaded or written into the memory A.

Figure 15:
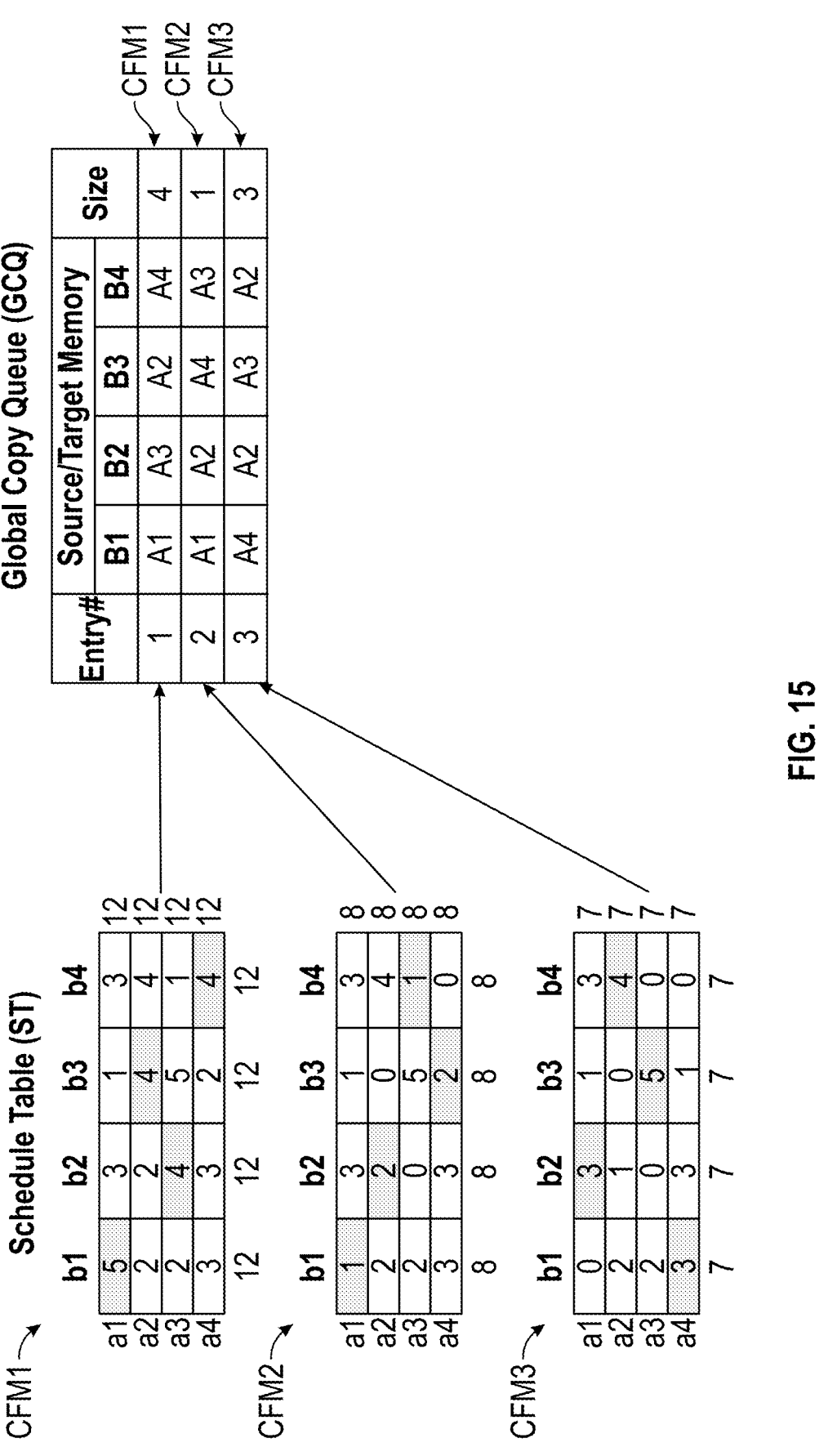

As each data element DE is accessed and the key K for that data element is determined, the corresponding count CNT for the key is incremented in the count histogram CH. Once all the data elements DE have been accessed, the key K determined, and the count CNT in the count histogram CH incremented accordingly, the count histogram CH is generated containing the proper CNT for each of the keys K0-K7 as shown in FIG. 15. The value of the count CNT for each key K in this count histogram CH corresponds to the number of occurrences of the key in the dataset of all the data elements DE in memory A. For example, the key K0 occurs only once in data element DE5 stored in memory A and so the count CNT=1 for key K0 as seen in the count histogram H on the right in FIG. 4. The key K7 (i.e., the key having the value 7) is contained in data elements DE1, DE2, and DE10, and thus the count CNT=3 for the key K7. Note the sum of all the counts CNT in the count histogram CH is equal to 12 since there are a total of twelve data elements DE contained in the dataset stored in the source memory A.

Once the counting sort algorithm has counted all the keys K of the data elements DE to generate the count histogram CH, the counting sort algorithm thereafter generates a key offset histogram OH that accounts for multiple values of the same key K for data elements DE in memory A. The offset histogram OH includes an offset OFF for each key K0-K7, each offset corresponding to a starting storage location for data elements DE including this key in a target memory B (not shown in FIG. 4). The offset histogram OH provides the offset OFF for each key K0-K7 to allow for respective data elements DE in the source memory A to be copied or stored in the proper storage location in the target memory B. FIG. 5 shows the offset histogram OH that is generated from the count histogram CH of FIG. 4. The value of the offset OFF for each key K0-K7 in the offset histogram OH is determined from the counts CNT of the prior keys. The value of the offset for the key K0 is set to zero since there is no offset for any data elements DE with the key K0 as these data elements will be the first to be stored in the target memory B. The sum of the counts CNT of prior keys K determines the value for each offset OFF in the offset histogram OH, as will be understood by those skilled in the art. For example, for the key K3 the value of the offset OFF is 5 since the sum of the counts CNT of prior keys K0, K1, K2 is equal to 5 (1 K0+2 K1+2K2). The offset OFF of 5 for the key K3 means that first data elements DE including the key K3 will be stored starting with the sixth storage location of the target memory B since all the data elements DE including keys K0, K1, K2 are stored in the first five storage location in the target memory B.

Figure 7:
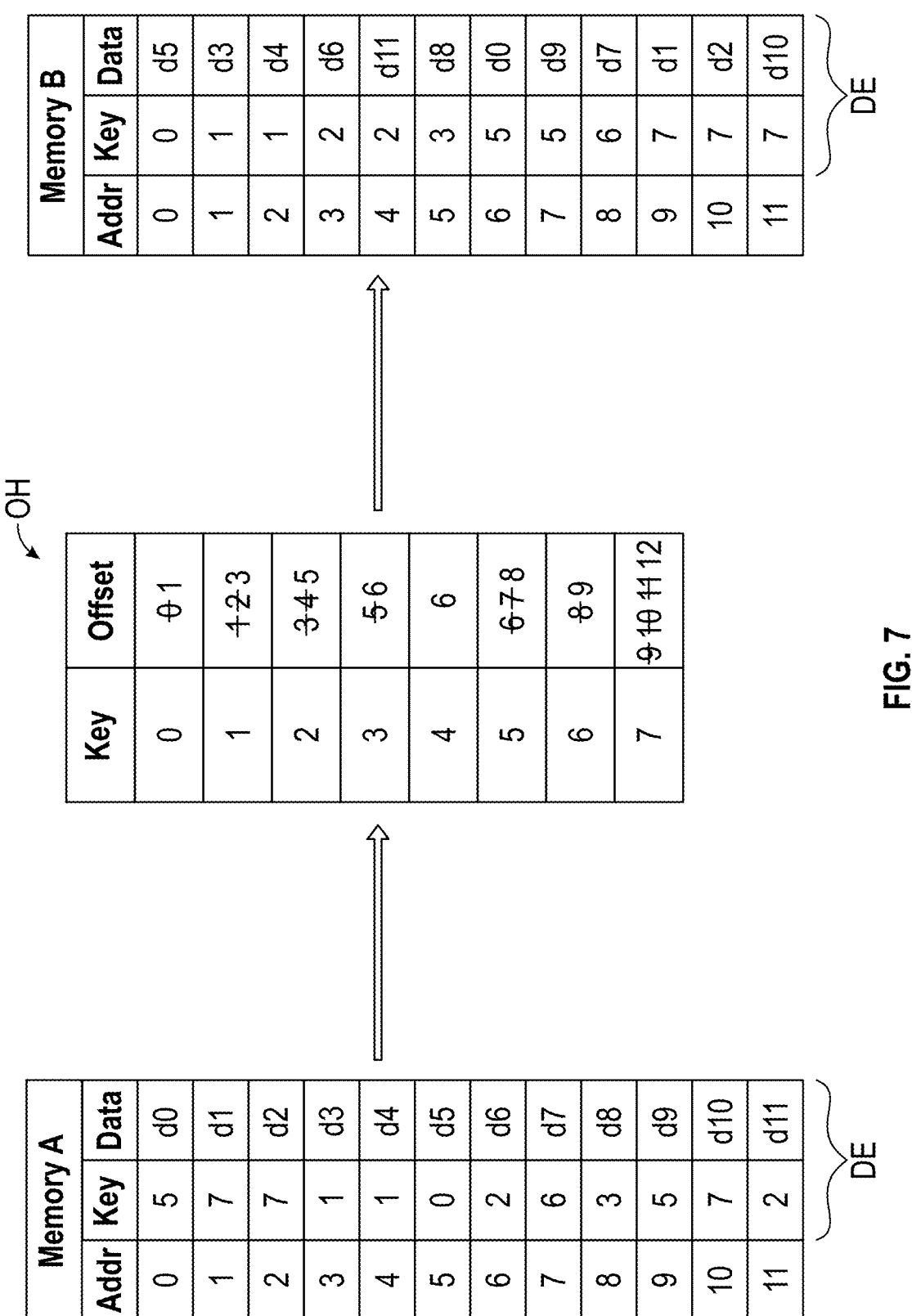

FIGS. 6 and 7 illustrate the storage or copying operation of the counting sort algorithm during which the offset histogram OH is utilized to copy the unsorted data elements DE stored in the source memory A into the target memory B to thereby store the sorted data elements in the target memory. FIG. 6 illustrates a single copy of the data element DE0 stored in the first storage location of source memory A (i.e., stored at address 0) into the proper storage location (i.e., storage location having address 6) in the target memory B. During copying, the counting sort algorithm accesses the initial data element DE0 stored in the first storage location (address 0) in the source memory A and determines the key is K5 for this data element. The counting sort algorithm then references the offset histogram OH for key K5 and determines the data element DE0 is to be copied in the storage location having address 6 in the target memory B. The data element DE0 in source memory A is then copied into target memory B at the storage location having the address 6. These operations are illustrated through the arrows in FIG. 6.

During this copying operation, the counting sort algorithm also increments the offset OFF in the offset histogram OH for the key K in the data element DE being copied. In the example copying operation of FIG. 6, the offset OFF for the key K6 in the offset histogram OH is incremented by 1 from 6 to 7. This is done so that the next time a data element DE in the source memory A containing key K5 is accessed, which will occur for data element DE9, the data element DE9 will be copied into the proper storage location at address 7 in the target memory B.

FIG. 7 illustrates the contents of the offset histogram OH and the target memory B after the counting sort algorithm has completed the copying operation and all data elements DE0-DE11 stored in source memory A have been copied into target memory B. After this copying operation, the data elements DE0-DE11 are sorted in the target memory B as seen in the target memory on the far right in FIG. 7. The data elements DE0-DE11 are sorted based on the key K0-K7 in the storage locations ADDR0-ADDR11 in the target memory B. The representation of the offset histogram OH illustrates the incrementing of each of the offsets OFF during the copying operation. A line through an offset OFF along with an incremented number represents this incrementing of the offsets OFF in the histogram OH during the copying operation. Each offset OFF is incremented a number of times that is equal to the corresponding count CNT for that key K. This is seen in comparing the offset histogram OH of FIG. 7 to the count histogram CH in FIG. 4. For example, the offset histogram OH of FIG. 7 show the offset OFF for key K2 in row 3 of the histogram being initially equal to 3 and is thereafter incremented first to 4 and then to 5. The offset OFF for key K2 is accordingly incremented twice, which corresponds to the count CNT for key K2, which is equal to 2 as seen in the count histogram CH in FIG. 4.

Figure 8:
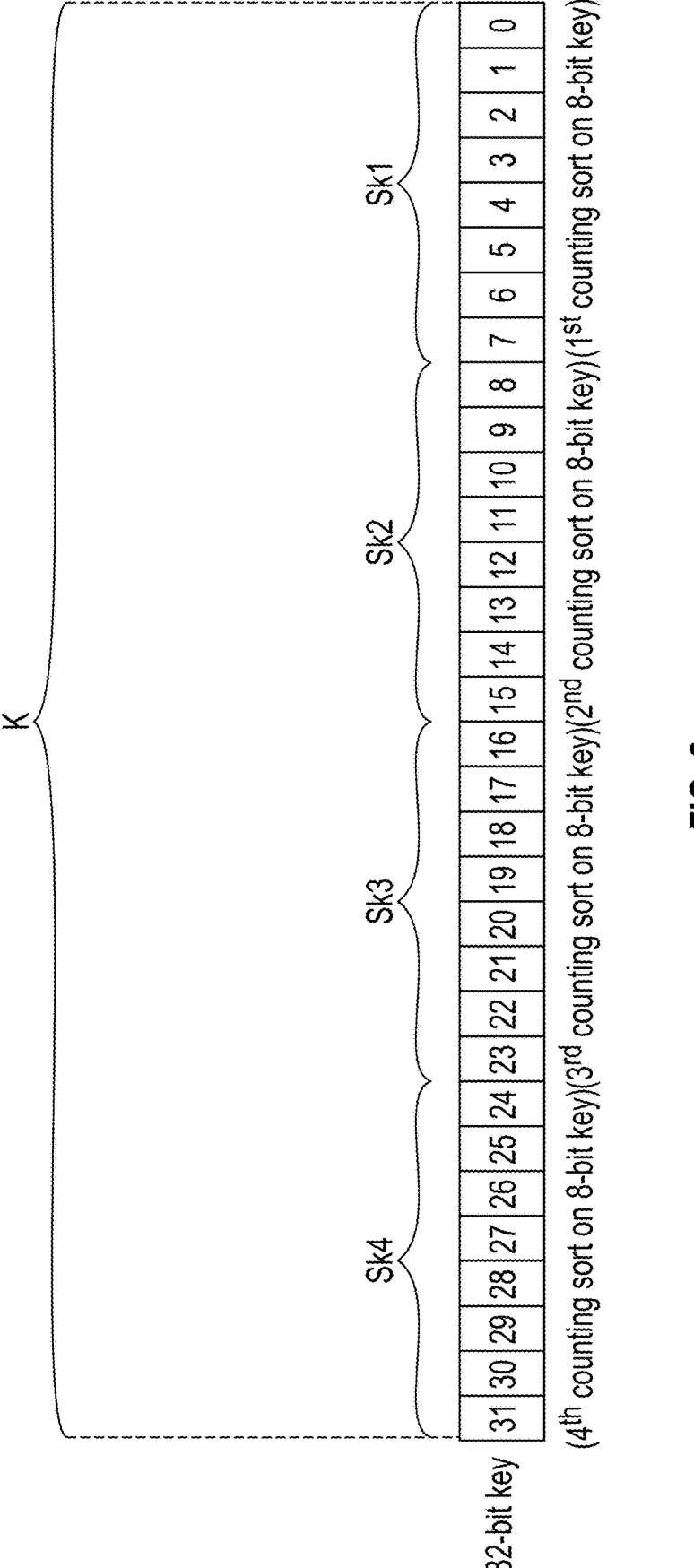
Figure 10:
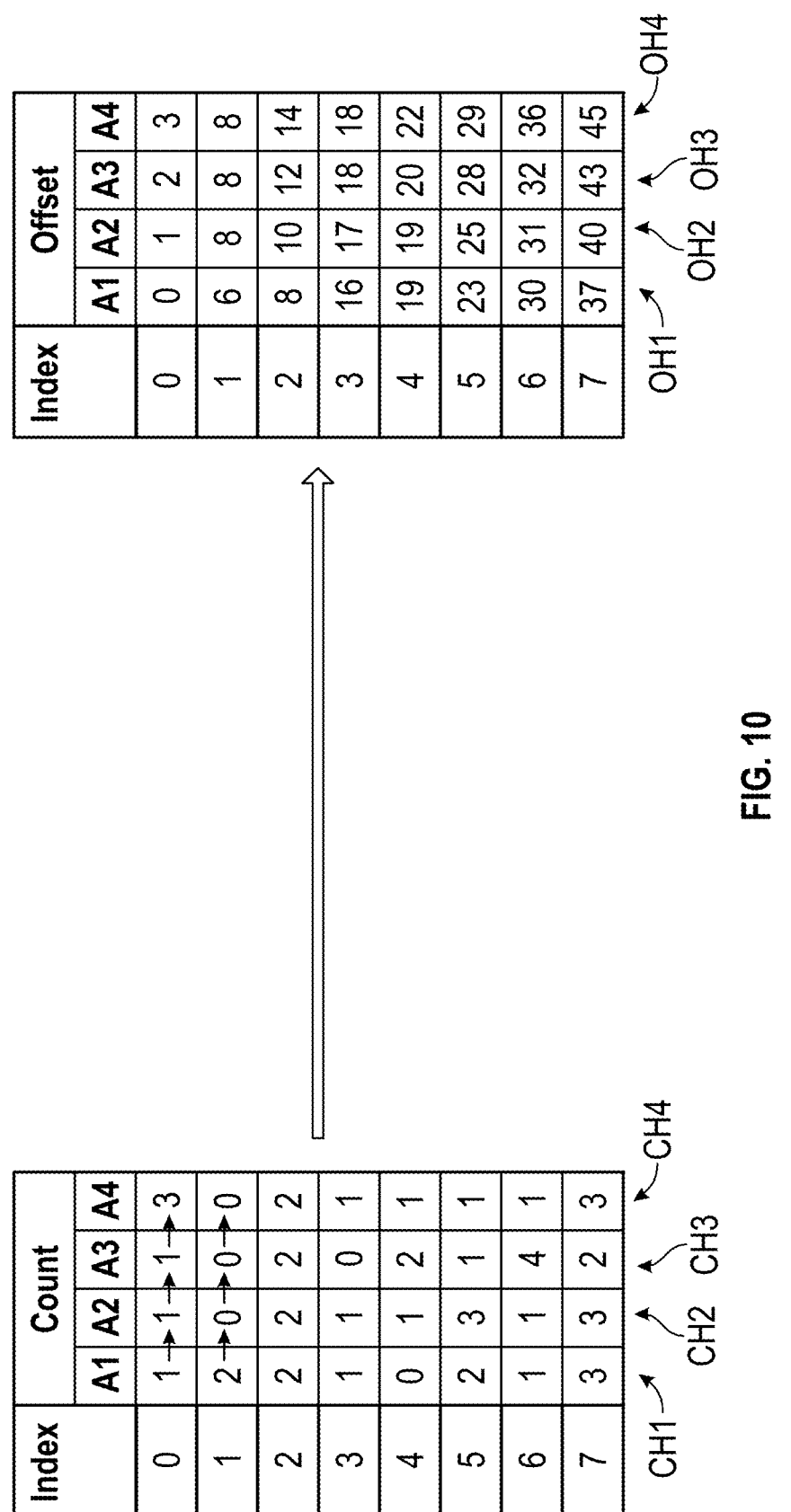

FIGS. 8-10 illustrate the operation of a parallel radix sort algorithm utilized in accordance with some embodiments of the present disclosure. The parallel radix sort algorithm is utilized where the size of the key K of each data element would make the memory requirements of the associated histograms prohibitively large. FIG. 8 illustrates an example where the key K is 32 bits long, which means there are $2^{32}$ or approximately 4 billion values for the key. As a result, if a counting sort was to be used, each of the count and offset histograms would need to include approximately 4 billion storage locations for all the rows or storage locations of each histogram. The parallel radix sort algorithm overcomes this issue for datasets including data elements having long keys by sequentially performing counting sorts on portions of the key K, where each of these portions of the key is referred to as "sub-key" herein. In the example of FIG. 8, the 32-bit long key K is divided into four sub-keys SK1-SK4, each sub-key being 8-bits long. The first sub-key SK1 corresponds to the first eight bits of the key K starting with the least significant bit LSB of the key K. Each of the second, third and fourth sub-keys SK2, SK3, and SK4 includes the next eight bits of the key K proceeding from least significant bit LSB to the most significant MSB, such that the fourth sub-key SK4 includes the eight most significant bits of the key K.

In the conflict-free parallel radix sort algorithm, a local sort followed by a global sorting as described above, is performed on each of the sub-keys SK1-SK4 of the key K. This is in contrast to a traditional parallel radix sort algorithm in which a single sorting operation, typically a counting sort, is performed on each sub-key SK of the key K. In some embodiments of the present disclosure, the local sort performed on each sub-key SK1-SK4 is a counting sort as described above with reference to FIGS. 4-7. Referring to FIG. 9, the dataset of the data elements DE to be sorted is split across M memories, with M being 4 in the example being described with reference to FIGS. 8-10. Thus, there are four memories $A_1$-$A_4$, each storing a quarter of the data elements DE of the dataset being sorted in the example being described. For the 32-bit key K of FIG. 8 and the four sub-keys SK1-SK4, each sub-key SK1-SK4 is eight bits long and accordingly has 256 ($2^8$) possible values. Thus, the count histogram CH and offset histogram OH for each of the sub-keys SK1-SK4 has 256 rows or storage locations. This allows for storage of the counts CNT for all the possible values of the associated sub-key SK and the offset histogram OH associated with the counting sort for each sub-key SK will also have 256 rows for storing all the offsets OFF for the associated sub-key SK. FIG. 9 shows the count histograms CH1-CH4 and offset histograms OH1-OH4 associated with the data elements DE stored in each of the four memories $A_1$-$A_4$.

FIG. 10 illustrates the four local count histograms CH1-CH4 generated for the data elements DE in each of the memories $A_1$-$A_4$ for one of the sub-keys SK1-SK4 during operation of the parallel radix sorting algorithm. Only eight rows or storage locations for each of these histograms CH1-CH4 are shown in FIG. 10 to simplify the figure, but for the 8-bit sub-keys SK in the example being described there would be 256 rows in each of these histograms. These four local histograms CH1-CH4 must then be "merged" as illustrated through the arrows to generate the offset histograms OH1-OH4 for the data elements DE in each of the memories for the sub-key SK. The parallel radix sorting algorithm is performed or iterated one time for each sub-key SK1-SK4. For each iteration, a counting sort is performed on the corresponding sub-key SK1-SK4 (i.e., performed on k-bits of the key K) to generate a local count histogram CH for the data elements DE stored in each of the memories $A_1$-$A_4$. These local count histograms CH1-CH4 are generated in parallel and are thereafter merged to generate the corresponding offset histograms OH1-OH4 as shown in FIG. 10.

The data elements DE stored in the memories $A_1$-$A_4$ are then copied into target memories B (not shown in FIGS. 8-10; see FIGS. 1 and 2 showing target memories B) using the offset histograms OH1-OH4. The offsets in these offset histograms OH1-OH4 correspond to memory locations in the memories $B_1$-$B_4$, where the first twelve locations for the storage of data elements DE are in the memory $B_1$, the next twelve locations are in the memory $B_2$, and so on in the simplified embodiment being described by way of example. The offset being utilized during copying is incremented as corresponding data elements DE are copied, as described above in relation to FIGS. 6 and 7. The parallel radix sort algorithm iterates this process one time for each of the radix or sub-keys SK of the key K, with the sorted data elements DE being stored in the target memories (i.e., memories $A_1$-$A_4$) after the final iteration of the algorithm. The parallel radix sort algorithm is subject to being slowed down during copying of sorted data in source memories to target memories due to memory copying conflicts, which as discussed above with reference to FIGS. 2A, 2B, will serialize these copying operations and slow down completion of algorithm in sorting the dataset. Embodiments of the present disclosure eliminate these memory copying conflicts to thereby reduce the time required to sort the dataset, as will be described in more detail below.

Figure 11:
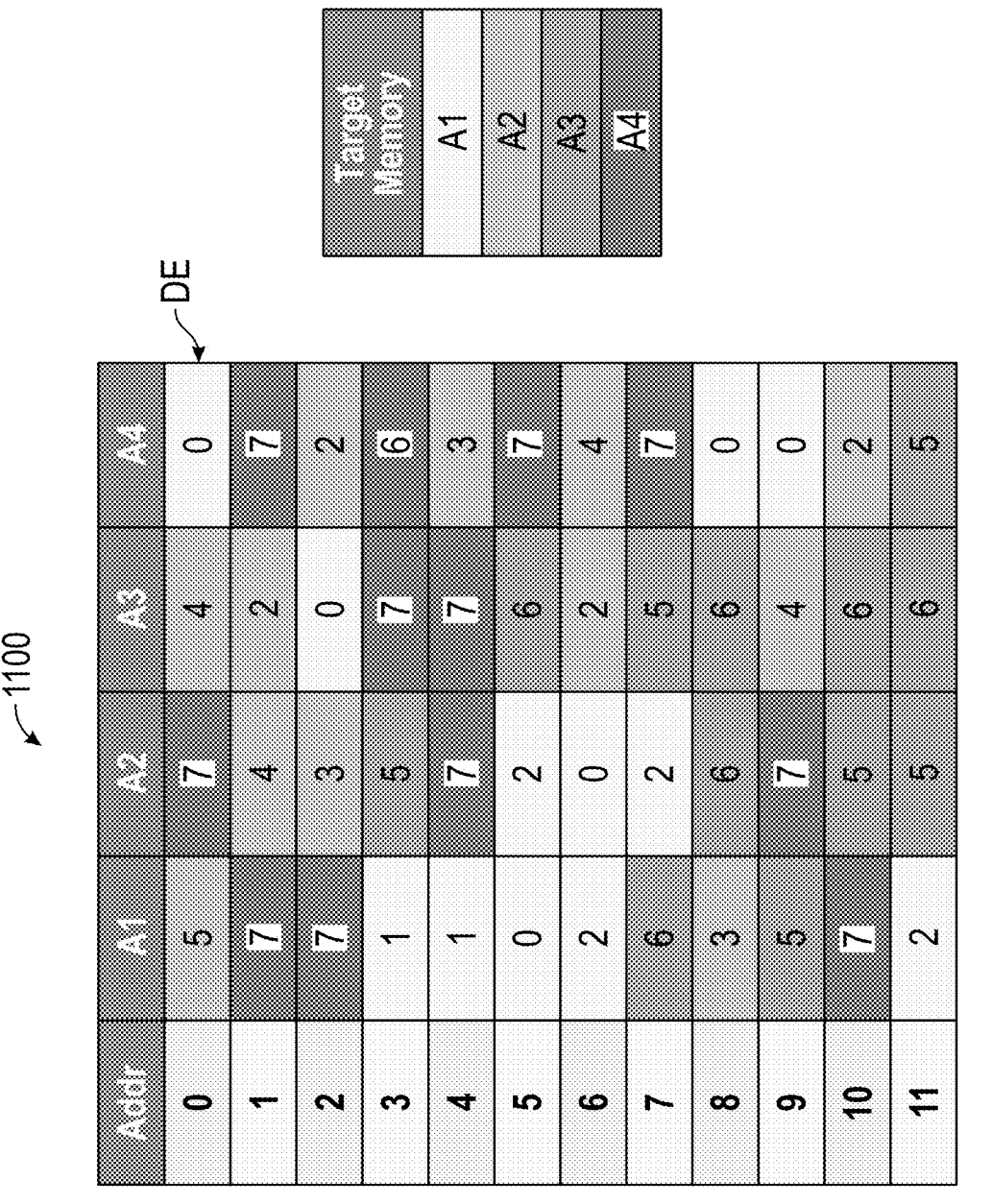

FIGS. 11-19 illustrate in more detail the operation of the conflict-free parallel radix sorting process 300 of FIG. 3 in accordance with some embodiments of the present disclosure. The example of FIGS. 11-19 is a simplified example, with each of the memories A and memories B having twelve storage locations ADDR0-ADDR11 to store twelve data elements DE and the key K of each data element having one of eight possible values 0-7 for the current iteration of the conflict-free parallel radix sort algorithm. As mentioned above, the role of the memories A and B vary during operation of the algorithm 300. The memories A are source memories and memories B target memories during the local sorting portion of the algorithm, while memories B are source memories and memories A are target memories during the global sorting portion of the algorithm. FIG. 11 illustrates a table 1100 representing the original unsorted dataset of data elements DE stored in four source memories $A_1$-$A_4$. Each source memory $A_1$-$A_4$ corresponds to a column in the table 1100 with the corresponding data elements DE in data locations ADDR0-11 of this memory. Only one data element DE stored in the source memory $A_4$ and shown the first row and final column of the table 1100 is labeled to simplify the figure.

In FIG. 11, each data element DE is shaded to indicate the destination of that data element in a corresponding target memory (i.e., one of the memories A) at the end of execution of the conflict-free radix sorting algorithm. The shading for the each of the ultimate target memories $A_1$-$A_4$ of the sorted data elements is shown in FIG. 11. Thus, the shading of each data element DE initially stored in memories A1-A4 indicates where this data element will end up being stored after sorting of the dataset to store the sorted data elements DE in the memories $A_1$-$A_4$. This shading of data elements DE also illustrates memory copying conflicts that would arise in copying data elements from the source memories $A_1$-$A_4$ to the target memories $B_1$-$B_4$ in a traditional parallel radix sorting algorithm. Each row of the table containing data elements DE of the same shading has a memory copying conflict. This is true because data elements DE having the same shading are to be copied to the same target memory $A_1$-$A_4$. Recall, during the copying operation of a parallel radix sort, the same storage location ADDR of each source memory A is accessed so that the corresponding data elements DE in these storage locations may be copied into a corresponding one of the target memories B. In the example of FIG. 11, every copy operation of data elements DE that would need to be performed as part of a parallel radix sort would involve at least one memory copying conflict. For example, when the storage locations ADDR0 in each source memory $B_1$-$B_4$ (not shown in FIG. 11) are accessed, the data elements DE stored in this location in the source memories B1 and B3 must both be copied to the target memory A2. As a result, the copies of these data elements DE in source memories B1, B3 would need to be serialized, slowing down the operation of the sorting algorithm. The conflict-free parallel radix sorting algorithm according to embodiments of the present disclosure eliminates such memory copying conflicts.

Figure 12:
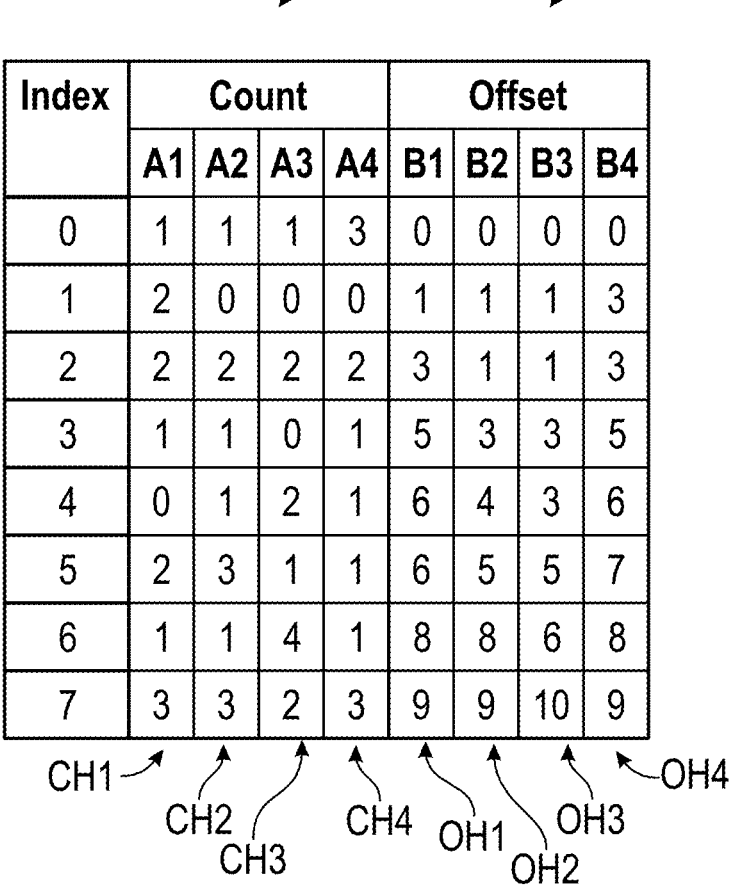

In the conflict-free parallel radix sorting algorithm according to embodiments of the present disclosure, a new sorting operation is introduced that is referred to as the "local sorting operation." This operation was discussed above with reference to FIG. 3 and the local sorting operation 302 of the conflict-free parallel radix sorting algorithm 300. FIG. 12 illustrates the operation of the local sorting operation 302 in generating respective count histograms CH1-CH4 and offset histograms OH1-OH4 for the data elements DE stored in the source memories $A_1$-$A_4$. Recall, as discussed above, during the local sorting operation 302 the memories $A_1$-$A_4$ are the source memories and the memories $B_1$-$B_4$ are the target memories in the example embodiments described in the present application. This operation 302 sorts the data elements DE of each source memory $A_1$-$A_4$ "locally" through a counting sort of these data elements in embodiments of the present disclosure. The counting sort algorithm was discussed above with reference to FIGS. 4-7. In the example of FIG. 12 note that the data elements DE stored in source memory A1 are the same as those in the memory A in the example of FIGS. 4-7. As a result, the count histogram CH1 and offset histogram OH1 associated with the memory A1 are the same as those of FIGS. 4-7.

The offset histograms OH1-OH4 in FIG. 12 are associated with the target memories B1-B4 since these offset histograms are utilized to give the proper data locations ADDR in the target memories to store the data elements DE from the corresponding source memory A1-A4, and thereby store the locally sorted data elements in the target memory. Both the counts CNT in the count histograms CH and the offsets OFF in the offset histograms OH are saved because the offsets must be subsequently recalculated for performing the global sorting of the data elements DE. The global sorting is the final sorting of the data elements DE in operation 306 as previously described for FIG. 3. Thus, memory is used in the conflict-free radix sorting algorithm 300 to maintain these count and offset histograms CH, OH. This is true because the offsets OFF need to be recalculated later for the global sorting operation 306, as will be described in more detail below. The amount of memory required to maintain these count and offset histograms CH, OH should be insignificant compared to the memory required for storing the data elements DE. Furthermore, the memory for these count and offset histograms CH, OH may be reused during the global sorting operation 306 to count keys K for next radix iteration.

Figure 13:
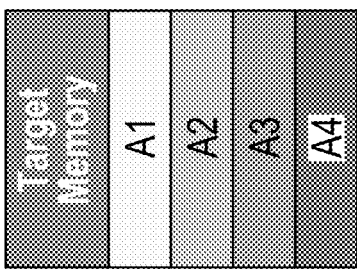

After the performing the local sorting operation 302 utilizing the local histograms CH, OH of FIG. 12, the data elements DE of each source memory $A_1$-$A_4$ are stored as a locally sorted dataset in each corresponding target memory $B_1$-$B_4$ as shown in FIG. 13. Thus, after operation of the local sorting operation 302, the locally sorted data elements DE of memory $A_1$ are stored as a locally sorted dataset in memory $B_1$, and the same is true for the data elements of memory $A_2$ stored in memory $B_2$, the data elements of memory $A_3$ stored in memory $B_3$, and the data elements of memory $A_4$ stored in memory $B_4$. The dataset of data elements DE stored in each of the source memories A1-A4 is sorted and stored in target memories B1-B4, respectively. The offsets OFF in the local offset histograms OH1-OH4 are used to copy the data elements in each source memory A1-A4 to the corresponding target memory B1-B4 to thereby store the corresponding locally sorted data elements in each of the target memories. As seen in FIG. 13, the locally sorted data elements DE in each target memory B1-B4 are now grouped by the ultimate target memory A1-A4 in which the data element DE will be stored after completion of the conflict-free parallel radix sorting algorithm. For example, the data elements DE for the ultimate target memory A1 after completion of the global sorting operation, which correspond to data elements having keys K0, K1 and K2 in this example, are stored in the initial storage locations ADDR of the respective memories $B_1$-$B_4$. Next, the data elements DE having keys K2, K3, K4 are saved in storage locations in memories $B_1$-$B_4$, and so on for data elements having keys K5-K7 to be ultimately stored in memories $A_3$, $A_4$. In this way, data elements DE for a particular target memory A are grouped together in the memories $B_1$-$B_4$. The locally sorted data elements DE in the memories B1-B4 of FIG. 13 are ready for the global sorting operation 306 to store the locally sorted data elements DE for the particular sub-key SK or radix iteration being executed to be stored in the target memories A1-A4 during the global sorting operation. As mentioned above, in embodiments of the present disclosure there are two banks of memories A, B, and depending on whether the conflict-free parallel radix sorting algorithm is executing the local sorting operation 302 or global sorting operation 306 (FIG. 3) determines whether the memoires in each bank are source memories or target memories. If the unsorted data elements DE of the large dataset are initially stored in source memories A, then the memories A are source memories and the locally sorted data elements will be stored in target memories B during the local sorting operation 302. During the global sorting operation 306, the memories containing the locally sorted data elements DE, namely memories B, are the source memories while the memories A are the target memories that will store the globally sorted data elements after the global sorting operation 306.

In FIG. 13, the shading of each data element DE again corresponds to the eventual target memory $A_1$-$A_4$ that will contain the data element after completion of the conflict-free parallel radix sorting algorithm. While the local sorting operation 302 adds an additional operation to a conventional parallel radix sort, the local sorting operation involves only simple independent counting sorts on each of the source memories A1-A4. These counting sorts on the source memories A1-A4 are performed in parallel. Moreover, the local sorting operation 302 is always conflict-free since copying between source memories A and target memories B involves only a single target memory B for each source memory A. For example, the counting sort of data elements DE in source memory A1 are copied only to target memory B1, data elements in source memory A2 only copied to target memory B2, and so on, so no memory copying conflicts arise during the local sorting operation 302. This reduces the amount of time required to perform the local sorting operation 302.

Although the local sorting operation 302 does add an additional operation to traditional parallel radix sorting, the local sorting of the respective data elements DE in the target memories B1-B4 in this manner enables conflict-free memory copying during the final memory copying operation 306 of the sorting algorithm 300 of FIG. 3. The local sorting operation is introduced in the conflict-free parallel radix sorting algorithm to facilitate scheduling. This approach works because the local sorting effectively groups the data elements by target memories for the global sorting operation. This makes it easier to find the next data element for a specific target memory by tracking offsets of these groups. Eliminating memory copying conflicts results in a better worst-case performance of the conflict-free parallel radix sorting algorithm 300 than for a traditional parallel radix sort involving two or more source and target memories. In addition, in embodiments of the conflict-free parallel radix sorting algorithm the performance hit on the overall algorithm due to the addition of the local sorting operation 302 is lessened by counting the keys K for the next iteration of the radix sorting algorithm during global sorting of the current iteration of the radix sorting algorithm, as will be described in more detail below. Furthermore, the scheduling operation 304 of the conflict-free parallel radix sorting algorithm 300 executes in parallel with the local sorting operation 302. The input to a scheduling algorithm executed during the scheduling operation 304 is a schedule table that may be computed from the same counts CNT as generated during the local sorting operation 302. The output of the scheduling algorithm is a mapping of source memories B storing the respective locally sorted data elements DE to target memories A and a size indicating the number of memory copies that can be performed with this mapping, with the results being stored in a global copy queue, as will be described in more detail below.

Figure 14:
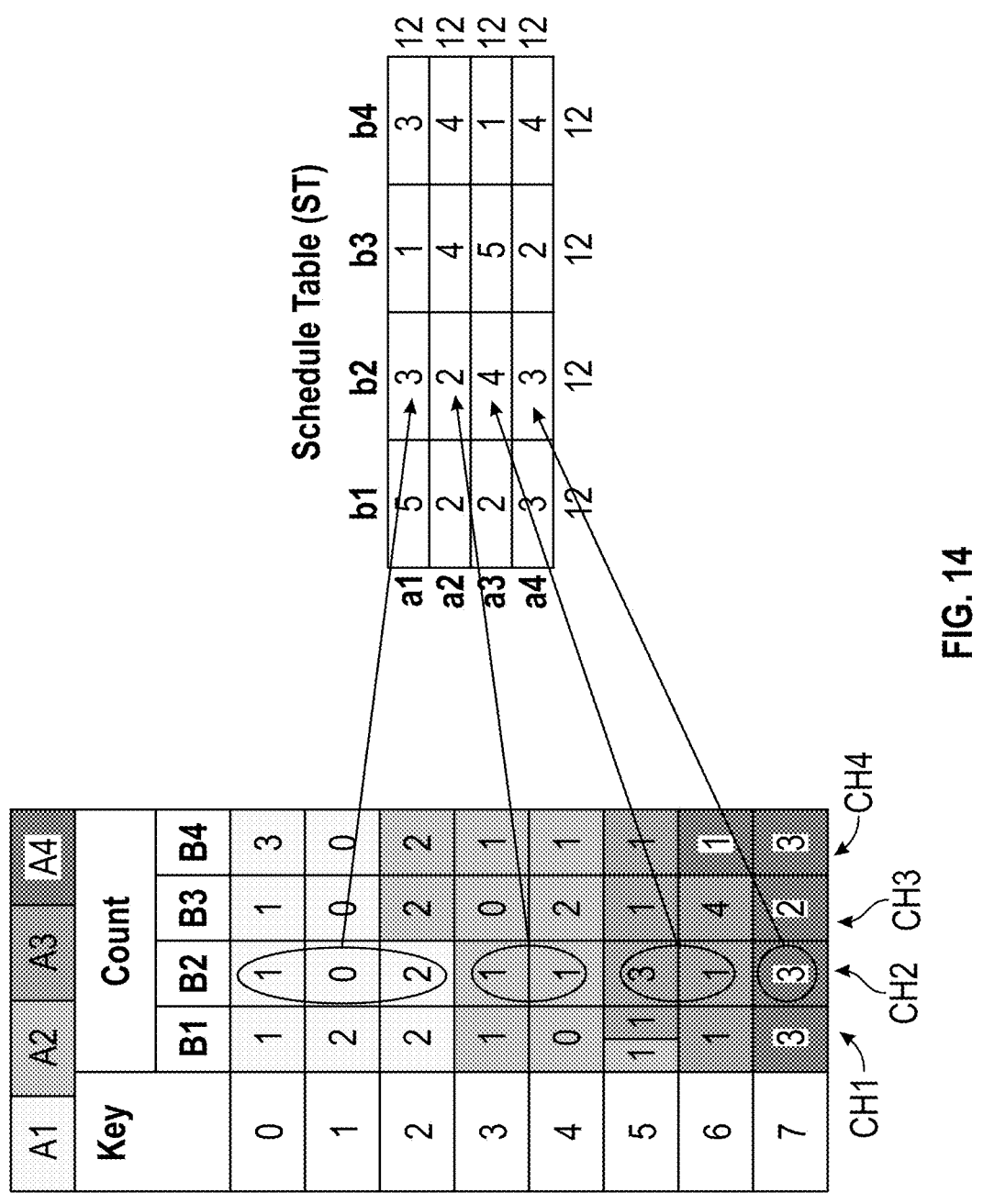

FIG. 14 illustrates generation of a schedule table ST as part of the scheduling operation 304 of the conflict-free parallel radix sorting algorithm 300 in accordance with embodiments of the present disclosure. In the schedule table ST, keys K of the locally sorted data elements DE are assigned to target memories, with smaller keys coming before larger keys. The schedule table ST is utilized during the global sorting operation 306 (FIG. 3) and thus the schedule provides a scheduling for copying the locally sorted data elements DE stored in the source memories B to the target memories A. This will be done for each iteration of the radix sort and thus the scheduling is done based on the sub-keys SK of the particular iteration of the radix sort being executed. For the schedule table ST, data elements DE having equal keys K in lower numbered source memories B come before data elements with these keys in higher numbered source memories. Each field or cell C(i, j) in the schedule table ST represents the number of memory copies to be performed from source memory Bj to target memory Ai. Index j=1-4 for the source memories B while index i=1-4 for the target memories A in the simplified example being described.

The counts for the cells C(i,2) in the schedule table ST will now be described in more detail to further illustrate the structure of the schedule table. FIG. 14 illustrates the count histograms CH1-CH4 of FIG. 12 that were generated for the data elements DE in the source memories A1-A4 during the local sorting operation 302 (FIG. 3). The cells C(i, 2) correspond to the copy counts in column 2 of the schedule table ST and correspond to copies from the source memory $B_2$ to each of the target memories $A_1$-$A_4$. For example, the cell C(1,2)=3 and indicates the number of copies that are to be performed from source memory $B_2$ to target memory A1 for data elements DE having keys K0, K1, K2 in the source memory $B_2$. The counts of the data elements DE in source memory $B_2$ corresponding to this copy count of 3 for the cell C(1,2) are illustrated through the circle around these elements and the corresponding arrow in FIG. 14. The cell C(2,2)=2 indicates the number of copies that are to be performed from source memory $B_2$ to target memory $A_2$ for the count of data elements DE having keys K3, K4 in the source memory $B_2$. The counts of the data elements DE in source memory $B_2$ corresponding to this copy count of 2 for the cell C(2,2) are illustrated through the circle around these elements and the corresponding arrow in FIG. 14. The copy counts C(3,2)=4 and C(4,2)=3 and the corresponding counts CNT of data elements DE in source memory $B_2$ from the count histogram CH2 for the corresponding keys K5, K6, K7 are similarly illustrated through circles and arrows in FIG. 14 as described above for cells C(1,2) and C(2,2).

The schedule table ST is generated while calculating the count histograms CH for the local sorting of data elements DE in the source memories A1-A4 during the local sorting operation 302. This local sorting does not affect the scheduling of copying of data elements DE during the memory copying or global sorting operation 306. In the schedule table ST of FIG. 14, the bottom and right edges show the sums of the counts for each column and row, respectively. These sums, which have a value of 12 in the present example. The sum of the copy counts of each column and each row will always be the same because all memories are the same size (i.e., 12 storage locations ADDR0-ADDR11 in this example as seen in FIG. 13).

FIG. 15 illustrates operation of the scheduling algorithm in the scheduling operation 304 in generating a global copy queue GCQ that is utilized in the memory copying operation 306 to copy locally sorted data elements DE in the source memories $B_1$-$B_4$ (FIG. 13) into the target memories $A_1$-$A_4$. The scheduling algorithm functions to find set S of M non-zero cells C, where M=4 in the example being described, where these four cells do not overlap in row or column of the schedule table ST. Such a set S of cells C represents a conflict-free mapping from the source memories B to the target memories A. In FIG. 15, three different conflict-free mappings CFM1-CFM3 for cells C in the schedule table ST are illustrated. Each row of the global copy queue GCQ represents a single conflict-free mapping.

Initially, the scheduling algorithm begins with the generated schedule table ST from FIG. 14. A first conflict-free mapping CFM1 is identified by the scheduling algorithm from the schedule table ST, with the set S of this conflict-free mapping shown in FIG. 15. The scheduling algorithm identifies a cell C having a minimum size (i.e., the smallest copy count) among the set S of cells in the identified conflict-free mapping CFM. The minimum size of the identified cell C in the set S defines the number of memory copies to be performed through the identified conflict-free mapping CFM. The first conflict-free mapping CFM1 has a minimum size cell C equal to 4 and thus the size of this first conflict-free mapping is equal to 4. The size determines the number of data elements DE to be copied to each target memory A during the memory copying operation 306 utilizing the global copy queue GCQ. The first conflict-free mapping CFM1 thus includes the set S of identified cells C along with the size of the conflict-free mapping. Thus, the first conflict-free mapping CFM1 then stored in the first row of the global copy queue GCQ as shown in FIG. 15. The size 4 of this first conflict-free mapping CFM 1 is stored in first row of the global copy queue GCQ as part this mapping as shown.

The scheduling algorithm thereafter modifies the schedule table ST by subtracting the size of the identified first conflict-free mapping CFM 1 from each of the cells C in the set S corresponding to this mapping. This modified schedule table ST is illustrated in FIG. 15, which will now be described in more detail with reference to a second conflict-free mapping CFM2 that is identified by the scheduling algorithm. Once the scheduling algorithm has modified schedule table ST, the scheduling algorithm again identifies a set S of non-zero cells C in the modified schedule table that defines another conflict-free mapping from the source memories B to the target memories A. Once again, the identified set S defines four cells C, one for each source memory B and target memory A in the present example, where these cells do not overlap in row or column of the schedule table ST.

A second conflict-free mapping CFM2 is shown for the modified schedule table ST in FIG. 15. The second conflict-free mapping CFM2 has a minimum size cell C equal to 1 and thus the size of the second conflict-free mapping is equal to 1. Once again, the scheduling algorithm stores the identified second conflict-free mapping CFM2 including the set S of cells C and size in the next row of the global copy queue GCQ, which is the second row in the present example. The scheduling algorithm thereafter once again modifies the schedule table ST by subtracting the size of the identified second conflict-free mapping CFM2 from each of the cells C in the set S corresponding to this second mapping. This newly modified schedule table ST as shown FIG. 15 is then utilized to identify a next conflict-free mapping, which is a third conflict-free mapping CFM3 in the example illustrated in FIG. 15.

The third conflict-free mapping CFM3 is shown for the newly modified schedule table ST illustrated in FIG. 15 and has a minimum size cell C equal to 3. The size of the third conflict-free mapping is accordingly equal to 3. Once again, the scheduling algorithm stores the identified third conflict-free mapping CFM3 including the set S of cells C and size in the third row of the global copy queue GCQ in the present example. The scheduling algorithm thereafter once again modifies the schedule table ST by subtracting the size of the identified second conflict-free mapping CFM2 from each of the cells C in the set S corresponding to this third mapping. This newly modified schedule table ST is then once again utilized to identify another conflict-free mapping to be stored in the global copy queue GCQ. The scheduling algorithm repeats this process until all cells C in the modified schedule table are equal to zero (i.e., C(i,j)=0 for all cells in the schedule table), at which point the global copy queue GCQ is complete and will contain all required mappings to perform conflict-free mappings from the source memories B to the target memories A.

FIG. 16 illustrates the final global copy queue GCQ in the example being described. As seen, the final global copy queue GCQ includes 6 conflict-free mappings (i.e., one mapping per row) to copy all locally sorted data elements DE from the source memories B to the target memories A. In the final global copy queue GCQ, each of the conflict-free mappings is valid for a number of copies based on the size field defined for mapping. During operation of the conflict-free parallel radix sorting algorithm, each entry or field in each conflict-free mapping in the global copy queue GCQ is processed in parallel since there are no memory copying conflicts by the way the global copy queue was constructed. As a result, memory copies in the memory copying operation 306 of the conflict-free parallel radix sort algorithm 300 may be performed at full throughput of the sorting system 100 (FIG. 1). The scheduling algorithm executed by the scheduling operation 304 executes in parallel with the local sorting operation 302 in accordance with embodiments of the present disclosure. Moreover, generation of the scheduling table ST and global sorting queue GCQ in the scheduling operation 304 will finish before completion of the local sorting operation 302 for all practical-sized scenarios and sorting systems 100 (FIG. 1).

Figure 17:
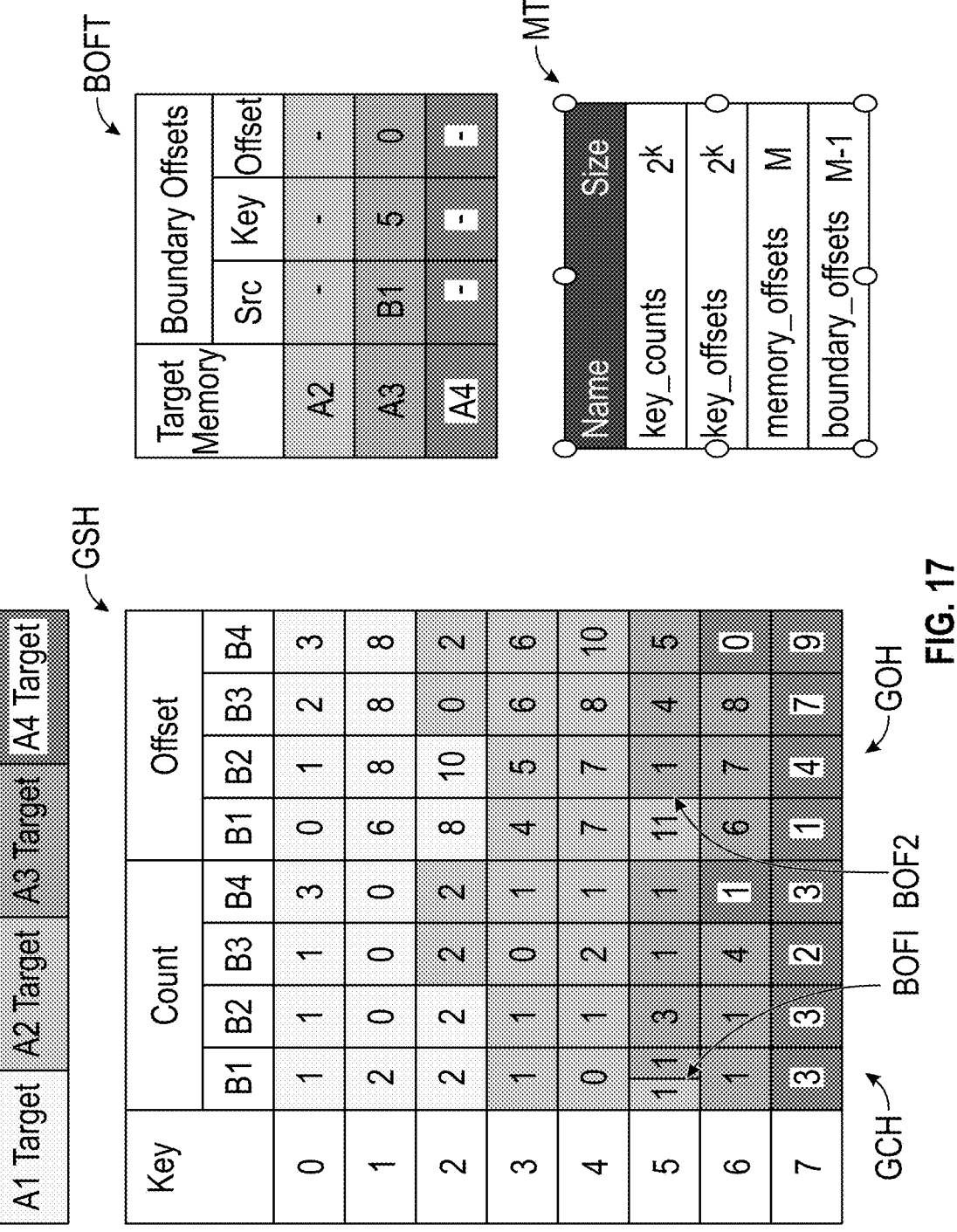

Once the global sorting queue GCQ has been generated, the next step of the scheduling operation 304 is to generate a global sort histogram GSH for copying the locally sorted data elements DE in the source memories B to the target memories A pursuant to the global copy queue GCQ. The global sort histogram GSH is shown in FIG. 17 and includes a global count histogram GCH and a global offset histogram GOH. Calculating the offsets OFF for the global offset histogram GOH is similar to merging the histograms in a traditional radix sort algorithm as discussed above with reference to FIG. 12. The only difference is that in generating the global offset histogram GOH an offset OFF may not be shared across target memory boundaries. Each given offset OFF in the histogram GOH applies to only one of the target memories A and may not apply to multiple target memories. A small number of additional boundary offsets BOF are needed to handle these boundary cases. Where there are M memories, only M−1 boundary offsets are required.

FIG. 17 illustrates a boundary offset table BOFT including boundary offsets BOF for the M−1 boundaries between the target memories A. In the example being described, M=4 since there are four target memories A and thus there are (M−1)=3 boundary offsets BOF to be stored in the boundary offset table BOFT. Each row of the boundary offset table BOFT accordingly corresponds to one of the potentially three required boundary offsets BOF. A boundary offset BOF is labeled BOF1 for the global count histogram GCH and is labeled BOF2 for the global offset histogram GOH in FIG. 17. This issue arises when copying from source memory B1 to target memory A3 since there are two keys K5 in source memory B1 but there is only room in target memory A2 for one these keys K5 from source memory B1. As a result, the boundary offset table BOFT defines a boundary offset of 0 for key K5 when copying from source memory B1 to target memory A3. This final key K5 from source memory B1 will accordingly be copied into the first storage location (offset of 0) in the target memory A3 pursuant to the entry in the boundary offset table BOFT for this boundary situation. The boundary offset table BOFT is a suitable data structure to contain the required information for each of the M−1 boundary offsets.

A memory table MT is also shown in FIG. 17 and illustrates the amount of memory required for the data structures required for the conflict-free parallel radix sorting algorithm 300. The data structures utilized by the algorithm 300 for the required histograms and tables as described may vary in embodiments of the present disclosure. The memory table MT illustrates data structures and sizes of those structures that are required by the conflict-free parallel radix sorting algorithm 300. A histogram data structure for each of the count histogram CH (key_counts in the MT) and offset histogram OH (key_offsets in the MT) is required, each of these data structures having a size of $2^k$ where k is the length in number of bits of the sub-key SK. A data structure is also required for memory offsets MOF and has a size of M, where M=4 in the example being described. A boundary offset data structure or table BOFT has a size of M−1 as just described.

The data structures illustrated the memory table MT uses additional memory for the conflict-free parallel radix sorting algorithm 300 when compared to a conventional parallel radix sorting algorithm. A conventional parallel radix sorting algorithm uses only one $2^k$ data structure for the counts CNT (i.e., count histogram CH) of the keys K of the data elements DE being sorted, and this same data structure is used for the corresponding offsets OFF for these data element (i.e., for the offset histogram OH). Thus, only a single $2^k$ data structure is required in a conventional parallel radix sort. Although the conflict-free parallel radix sorting algorithm 300 uses the additional data structures shown in the memory table MT of FIG. 17, the amount of memory used by these additional structures is relatively low. For example, where the key k=8 bits then each count and offset histogram CH, OH uses only 256 locations for storage of the required counts CNT and offsets OFF. For only a modest increase in memory requirements for the algorithm, the performance, namely the time required to sort the data element DE, of the conflict-free parallel radix sorting algorithm 300 may be much better than the performance of a conventional parallel radix sort in a worst-case scenario where lots of memory copy conflicts arise during sorting of the data elements.

FIG. 18 illustrates the calculation of a source memory histogram SMH including a source memory count histogram SMCH and source memory offset histogram SMOH that are generated by the scheduling operation 304 during execution of the conflict-free parallel radix sorting algorithm 300 in accordance with embodiments of the present disclosure. The source memory offset histogram SMOH is generated from the local count histograms for the source memories B in FIG. 18. The source memory count histogram SMCH indicates the total counts CNT for all the keys in each source memory B that are to be saved in a corresponding target memory A. Thus, the offsets in the SMOH histogram indicate the offset into a source memory Bi where a next data element for a corresponding target memory Aj is stored. For example, the count CNT for source memory B1 and target memory A1 is 5. This corresponds to the sum of the counts for the keys K0, K1, K2 stored in source memory B1, which is illustrated through the shading of the counts for these keys in the local count histogram CH1. The shading of these keys in the local count histogram CH1 indicates the data elements DE including these keys K0, K1, K2 in source memory B1 will be stored in target memory A1. Each row of the source memory count histogram SMCH indicates for each source memory B1-B4 the corresponding count CNT of data elements DE in that source memory that are to be stored in the corresponding target memory A1-A4. Each row of the source memory count histogram SMCH corresponds to a respective one of the target memories A1-A4.

The source memory offset histogram SMOH includes memory offsets of each source memory B1-B4 for all the target memories A1-A4. Each memory offset in a column of the source memory offset histogram SMOH corresponds to the local memory address in the corresponding source memory B of the next data element DE that is to be copied into the corresponding target memory A. These memory offsets are incremented as data elements DE are processed in the same as described above for the offset histograms OH with reference to FIGS. 6 and 7. These source memory offsets in the source memory offset histogram SMOH are generated based on the counts CNT in the source memory count histogram SMCH. The memory offsets in the source memory offset histogram SMOH for each of the source memories B1-B4 for the first target memory A1 are zero since the data elements DE associated with the first target memory are stored in the initial locations of each of the source memories. The memory offsets for the second target memory A2 correspond to the counts of the data elements DE associated with the first target memory A1 from the target memory count histogram TMCH. The memory offsets for each of the source memories B1-B4 accordingly correspond to the counts for the first target memory A1 in the global count histogram GCH, which is the first row of the global count histogram. Similarly, the memory offsets for the third target memory A3 correspond to the sums of the counts of the data elements DE associated with the first and second target memories A1, A2 from the target memory count histogram TMCH. Thus, the memory offsets for each source memory B1-B4 for the third target memory A3 is the sum of the counts of each source memory for the target memories A1, A2. This is the equivalent of adding together first two rows of target memory count histogram TMCH to obtain the offsets for the third target memory A3 in the third row of source memory offset histogram SMOH. Similarly, the counts CNT in the first three rows of the target memory count histogram TMCH for the target memories A1, A2, A3 are summed to obtain the offsets for the fourth target memory A4 in the fourth row of the source memory offset histogram SMOH.

Each offset OFF in the global offset histogram GOH gives the offset for a given source memory B1-B4 relative to, or for, a corresponding target memory A1-A4. For example, the offset for the source memory B2 for key K5 for target memory A3 is equal to 1, as seen in the global offset histogram GOH. Thus, source memory B2 writes data elements DE with key K5 to target memory A3 with an offset of 1. The source memory B2 also writes data elements DE with key K6 to target memory A3 with an offset of 7. The shading of each of the counts stored in the global count histogram GCH and indicates the target memory A to in which the corresponding data elements DE will be stored. The shading of each of the counts in the global count histogram GCH indicate the target memory A in which the data elements DE associated with this count will be stored. For example, the shading of the counts for the keys K0, K1, K2 in the source memory B1 is the same as the shading for the target memory A1 shown in FIG. 18. This indicates the data elements DE having any of the keys K0, K1, K2 that are stored in source memory B1 will be stored target memory A1 after the memory copy operation of the algorithm.

In embodiments of the conflict-free radix sorting algorithm 300, the separate count histograms CH and offset histograms are created for two reasons. Recall, as mentioned above, a parallel radix sort utilizes only a single data structure for the counts and offsets. The counts are overwritten in the data structure as no longer being needed when the offset histogram has been generated. In contrast, in the conflict-free radix sorting algorithm 300 separate counts CNT are maintained in the count histogram CH because these counts need to be preserved to recalculate offsets OFF for performing the global sorting in operation 306 of the conflict-free radix sorting algorithm 300. In embodiments of the algorithm 300, the counts CNT are populated for the next radix iteration during the global sorting operation of the current radix iteration, as will be described in more detail below with reference to FIG. 20. Regarding the offset histogram OH, the offsets OFF function in two different contexts. First, the offsets OFF function to address the local or individual target memories during local sorting of the data elements DE in operation 302 for the local offset histograms OH1-OH4 as described above with reference to FIG. 12. In addition, the offsets OFF provide for addressing any target memory during the global sorting in operation 306, as described above with reference to the source memory offset histogram SMOH of FIG. 18.

FIG. 19 illustrates the sorted dataset of all data elements DE stored in the target memories A1-A4 after completion of the conflict-free parallel radix sorting algorithm 300 for the current sub-key SK or radix. The data elements DE are completely sorted in the target memories A1-A4 based on the sub-keys SK of the data elements. The data elements DE are sorted in order of ascending order of sub-keys SK from target memory A1-A4 as seen in FIG. 19. This sorting is done for the given radix or sub-key SK being iterated, and the process or algorithm 300 described above with reference to FIGS. 11-19 must be repeated for each sub-key SK or each iteration of the conflict-free parallel radix sort. Once all iterations for each radix or sub-key SK have been completed, the dataset stored in the target memories A1-A4 in FIG. 19 is the complete sorted dataset for the data elements DE having the key K of FIG. 8.

Figure 20:
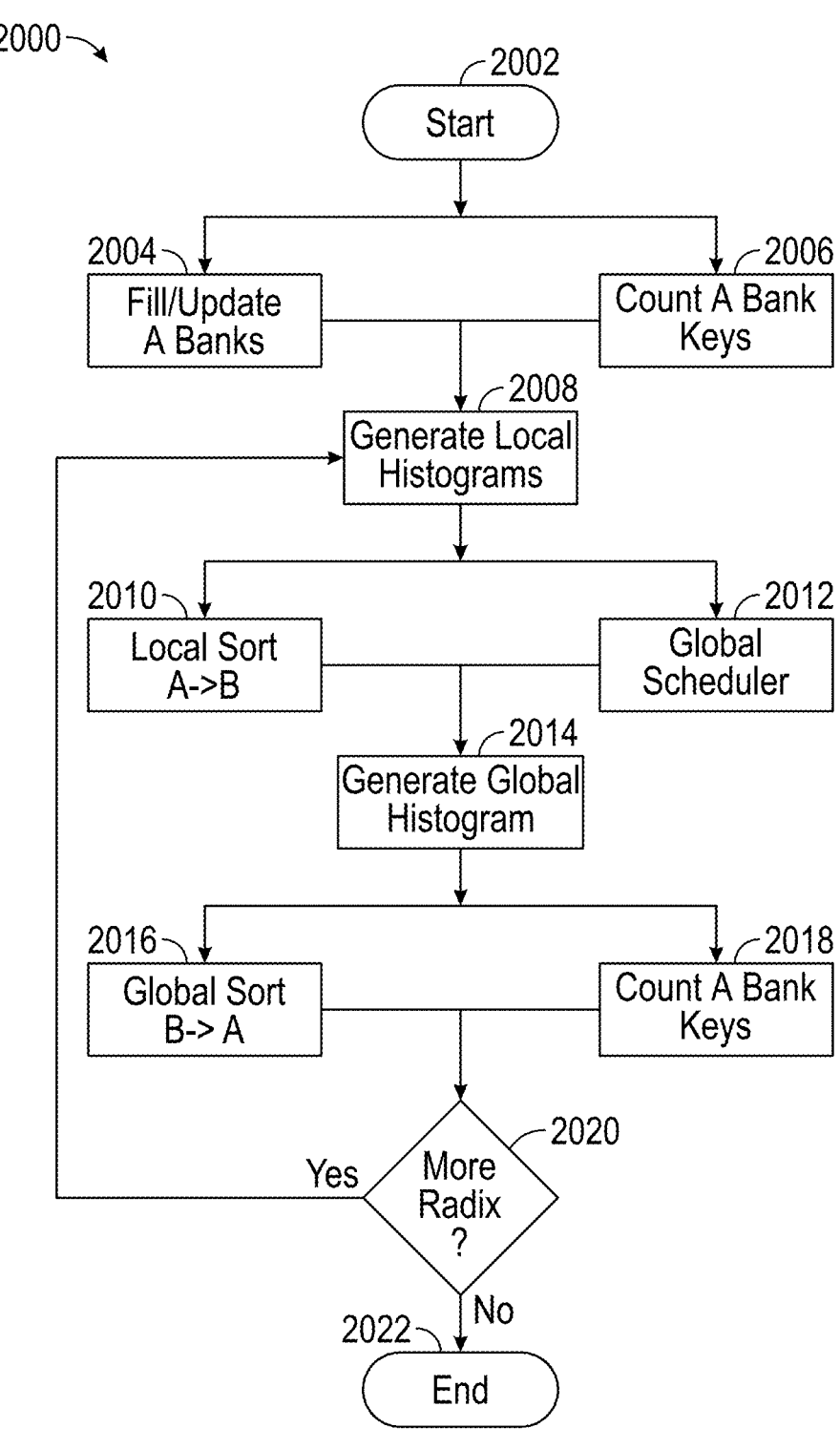
FIG. 20 is a more detailed flowchart of a process executed by the sorting system of FIG. 1 in accordance with some embodiments of the present disclosure.

FIG. 20 is a more detailed flowchart of a conflict-free parallel radix sorting process or algorithm 2000 executed by the sorting system 100 of FIG. 1 in accordance with some embodiments of the present disclosure. The algorithm 2000 begins at operation 2002 and proceeds to operation 2004 in which a new dataset of unsorted data elements DE are copied into a bank of source memories A. In one embodiment, as the data elements DE are being copied into the bank of source memories A, the keys K of the data elements are counted in a key counting operation 2006. In this way, the counts for the data elements DE stored in each of the source memories A are generated as the new dataset of unsorted data elements DE are copied into each of the source memories. Performing operation 2006 in parallel with operation 2004 on each source memory A reduces the overall time required to execute the conflict-free parallel radix sorting algorithm 2000. After operations 2004 and 2006, the algorithm 2000 proceeds to operation 2008 and generates the local count histogram CH and offset histogram OH for each of the source memories A. From operation 2008, the algorithm 2000 proceeds to a local sorting operation 2010 in the data elements DE contained in each of the source memories A is locally sorted in a corresponding target memory B as previously described with reference to FIGS. 4-13. The operation 2010 corresponds to the local sorting operation 302 described with reference to the conflict-free parallel radix sorting algorithm 300 of FIG. 3.

In the conflict-free parallel radix sorting algorithm 2000, once the local count histogram CH and offset histogram OH for each of the source memories A are generated in operation 2008, a global scheduling operation 2012 utilizing these histograms may execute in parallel with the local sorting operation 2010 to generate the schedule table ST for scheduling conflict-free memory copies of the locally sorted data elements DE stored in each of the memories B to the memories A during global sorting of the data elements. The operation 2012 corresponds to the scheduling operation 304 in the algorithm 300 of FIG. 3.

After execution of the local sorting operation 2010 and the global scheduling operation 2012 the algorithm 2000 proceeds to operation 2014 and generates global histograms as described above with reference to FIGS. 17 and 18 that are utilized to globally sort the locally sorted data elements DE stored in the memories B. The global histograms generated in operation 2014 include the boundary offsets for the boundary offset table BOFT and the target memory count histogram TMCH and source memory offset histogram SMOH. Once the required global histograms have been generated in operation 2014, the algorithm 2000 proceeds to global sorting operation 2016 and globally sorts the locally sorted data elements DE in each of the memories B to store the globally sorted dataset of data elements in the memories A. The global sorting operation 2016 includes copying locally sorted data elements DE in each of the memories B into the proper one of the memories A according to the schedule table generated in operation 2012.

A key counting operation 2018 operates in parallel with the global sorting operation 2016 and functions to count the keys K of each of the data elements DE being stored in each of the memories A during the global sorting operation. In this way, the operations 2016 and 2018 operate in parallel to reduce the overall time required to execute the conflict-free parallel radix sorting algorithm 2000. The operations 2016 and 2018 operate in parallel in the same way as previously described for operations 2004 and 2006. In this way, the operation 2018 counts the keys for the data elements DE stored in each of the memories A as these sorted data elements DE are copied into each of the memories A. This allows the local count histograms CH for each of the memories A to be generated using these counted keys K for the next iteration or radix of the parallel radix sort algorithm 2000.

After completion of operations 2016 and 2018, the conflict-free parallel radix sorting algorithm 2000 proceeds to operation 2020 and determines whether there are more radix or iterations of the algorithm to be determined. When the determination in operation 2020 is positive, there are more radix or iterations of the algorithm 2000 to be executed, and the algorithm returns to operation 2008 and once again generates local histograms for the data elements DE in each of the memories A based on the keys K counted for these data elements in operation 2018. The algorithm 2000 thereafter once again executes operations 2010-2018 to perform the next radix or iteration of the algorithm. If the determination in operation 2020 is negative, the algorithm proceeds to operation 2022 and terminates. The determination in operation 2020 is negative after all radix of the sorting algorithm have been executed and thus all iterations of the conflict-free parallel radix sorting algorithm 2000 have been completed, meaning the globally sorted dataset of all data elements DE is stored in the memories A.

In embodiments of the present disclosure, the parallelization of the key counting operation 2006, 2018 could be used in a conventional parallel radix sort algorithm to reduce the time required to execute the algorithm. A conventional parallel radix sort would count keys, generate the offset histogram, and copy data elements for each radix or iteration of the algorithm. Thus, counting keys during the initial loading of a dataset of data elements into a source set of memories (i.e., operation 2006) could be implemented in a conventional parallel radix sorting algorithm. The same is true for counting keys for a next radix or iteration during copying of data elements into target memories during a current iteration of the parallel radix sorting algorithm (i.e., operation 2018) could also be implemented in a conventional parallel radix sorting algorithm. Implementing these key counting operations in a conventional parallel radix sort will reduce the time required to execute the algorithm, and some embodiments of the present disclosure are directed to modified parallel radix sorting algorithms including parallel key counting operations. This parallelization of the copying and counting of the sub-keys could speed up the execution of a traditional parallel radix sorting algorithm by a factor of two, reducing by half the time required to execute the algorithm.

FIG. 21 illustrates the structure of a conflict-free schedule table ST that is generated and utilized by the conflict-free parallel sorting algorithms 300, 2000 to perform conflict-free memory copying of locally sorted data elements DE in a first bank of memories to a second bank of memories in accordance with some embodiments of the present disclosure. The properties of the conflict-free schedule table ST will now be discussed in more detail prior to discussing an algorithm for generating the schedule table in accordance with embodiments of the present disclosure. In relation to the schedule table ST, the following parameters are defined:

M=number of memories;

ai=source bank memory;

bj=destination bank memory;

n=number of remaining copies per bank of memories; and c(i,j)=number of remaining copies from ai to bj For the conflict-free schedule table ST, $$\forall \, i\varepsilon\{1 \; \dots \; M\}, \sum_{j=1}^{M} c(i, j) = n,$$

which dictates that all rows of the conflict-free schedule table ST sum to n. Also for the conflict-free schedule table ST, $$\forall \, j\varepsilon\{1 \; \dots \; M\}, \sum_{i=1}^{M} c(i, j) = n,$$

which dictates that all columns of the conflict-free schedule table ST also sum to n.

In generating the conflict-free schedule table ST, we want to select a solution set S containing M cells from the schedule table ST such that all cells in S are non-zero to maximize throughput, none of the cells share rows to ensure no source memory conflict, and none of the cells share columns to ensure no destination memory conflict.

Aspects of the schedule table ST were discussed briefly above with reference to FIG. 14. The set S represents a mapping from A memories to B memories where |S| is equal to M, which implies that there is always a maximal mapping. The number of copies that can be performed with this mapping is equal to the value of the smallest cell in the set S. When a solution set S if found, this mapping is queued for processing when the local sorting of data elements DE is completed. The minimum value of the cells in S is subtracted from all cells in S, which means that at least one cell in the set S will become 0. This operation maintains the property that all rows and columns of the modified schedule table ST sum to the same value then, and one may continue finding new mappings until no copies remain. In the following description and with reference to FIGS. 22-27, it will be shown that if there are non-zero cells in the schedule ST then a solution exists and therefore conflict-free mappings for memory copies of M memories in a first bank of memories to M memories in a second bank of memories are possible, which is what is needed to improve the operation of a parallel radix sort. The conflict-free parallel radix sorting algorithm according to embodiments of the present disclosure provide such conflict-free mappings through the schedule table ST to improve the operation of the algorithm.

Figure 22:
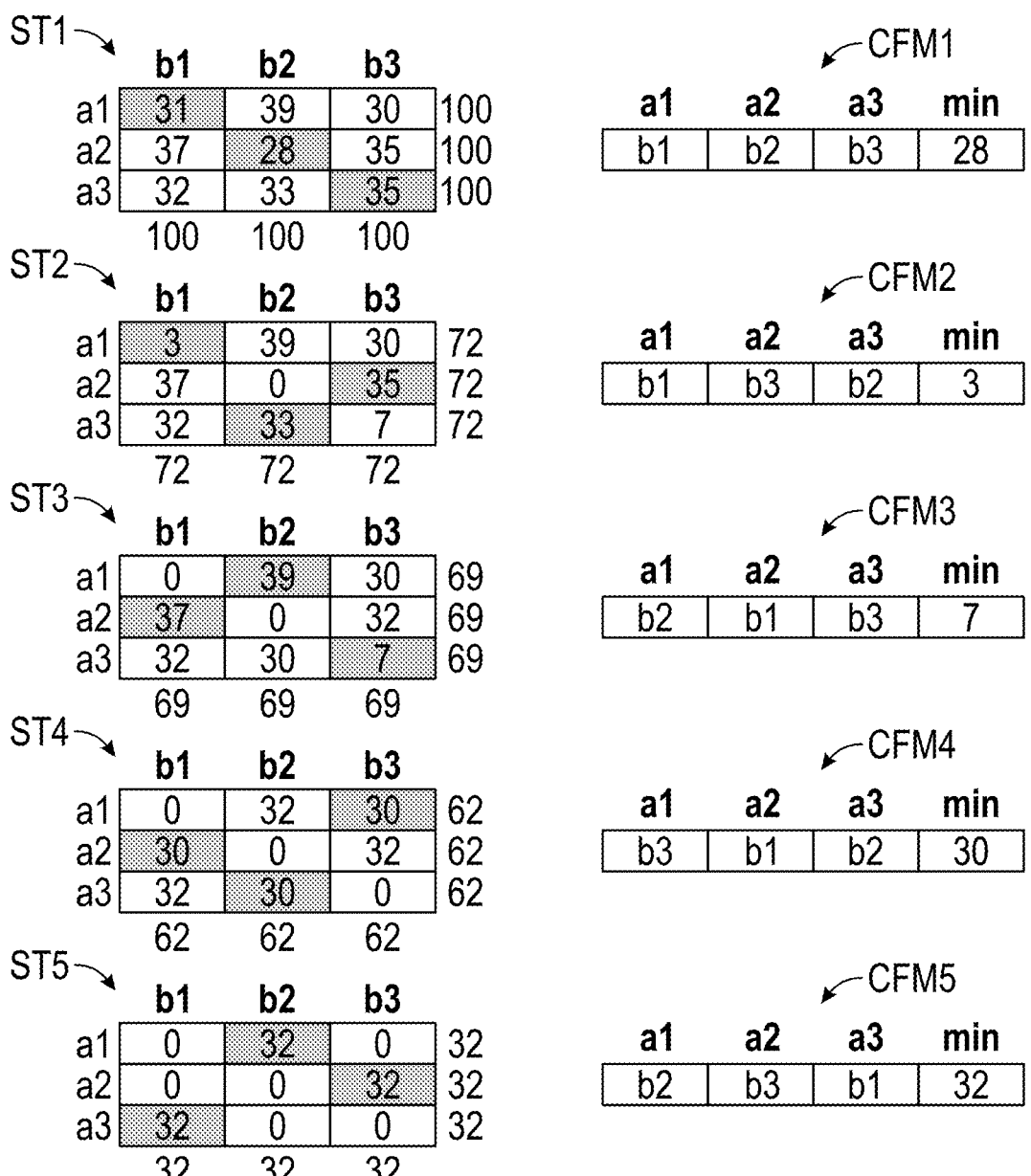
FIG. 22 illustrates examples of identifying conflict-free mappings of a simplified schedule table in accordance with some embodiments of the present disclosure.

FIG. 22 illustrates examples of identifying conflict-free mappings CFM of a simplified schedule table in accordance with some embodiments of the present. Each identified conflict-free mapping CFM is then stored as a conflict-free mapping in a global copy queue GCQ, as discussed above in relation to FIGS. 15 and 16. In the example of FIG. 22, the schedule table ST is a 3×3 table for a first bank of memories a1-a3 and a second bank of memories b1-b3. The initial schedule table is designated schedule table ST1 as shown in FIG. 22. All rows and columns in the initial schedule table ST1 sum to 100 in this example. Recall, as described above with reference to FIG. 14, each field or cell in the schedule table ST1 represents the number of memory copies to be performed from a source memory b1-b3 to a target memory a1-a3. A conflict-free mapping CFM1 is selected from the initial schedule table ST1 and is a set S illustrated by the shaded cells in the schedule table and given by: S={(1,1), (2,2), (3,3)}. The conflict-free mapping CFM1 is shown in the figure.

The schedule table ST1 is then modified by subtracting the minimum count value, which is 28, contained in the set S from each of the elements of the set S. Subtracting 28 from the cells of S for schedule table ST1 results in the modified schedule table ST2. From the modified schedule table ST2, a set S={(1,1), (2,3), (3,2)} is selected to define a second conflict-free mapping CFM2. Next, the minimum count value of this set S, which is 3, is then subtracted from each cell of this set S to yield the modified schedule table ST3. Once again, in the schedule table ST3 a set S={(1,2), (2,1), (3,3)} is selected to define a conflict-free mapping CFM3. The minimum cell count of 7 for this set S is then subtracted from each cell in the set to yield the modified schedule table ST4. In the schedule table ST4, the set S={(1,2), (2,3), (3,1)} is selected to define a conflict-free mapping CFM4. The minimum cell count of 30 is then subtracted from each cell in the set S to yield the modified schedule table ST5, and a set S={(1,3), (2,1), (3,2)} selected to define a conflict-free mapping CFM5. When the minimum cell count of 32 is subtracted from each of the set S for the modified schedule table ST5, every cell of resulting modified schedule table (not shown) is zero, indicating all required conflict-free mappings have been identified to perform conflict-free copies of all data elements DE in the second bank of memories b1-b3 in parallel to the first bank of memories a1-a3.

In embodiments of the present disclosure, the algorithm used to identify conflict-free mappings in the schedule table ST requires up to $M^2$ iterations or cycles to identify all the required mappings. In the example of FIG. 22, M=3 and so up to 9 iterations may have been required, although in the illustrated example only 5 iterations or cycles were needed.

Figure 23:
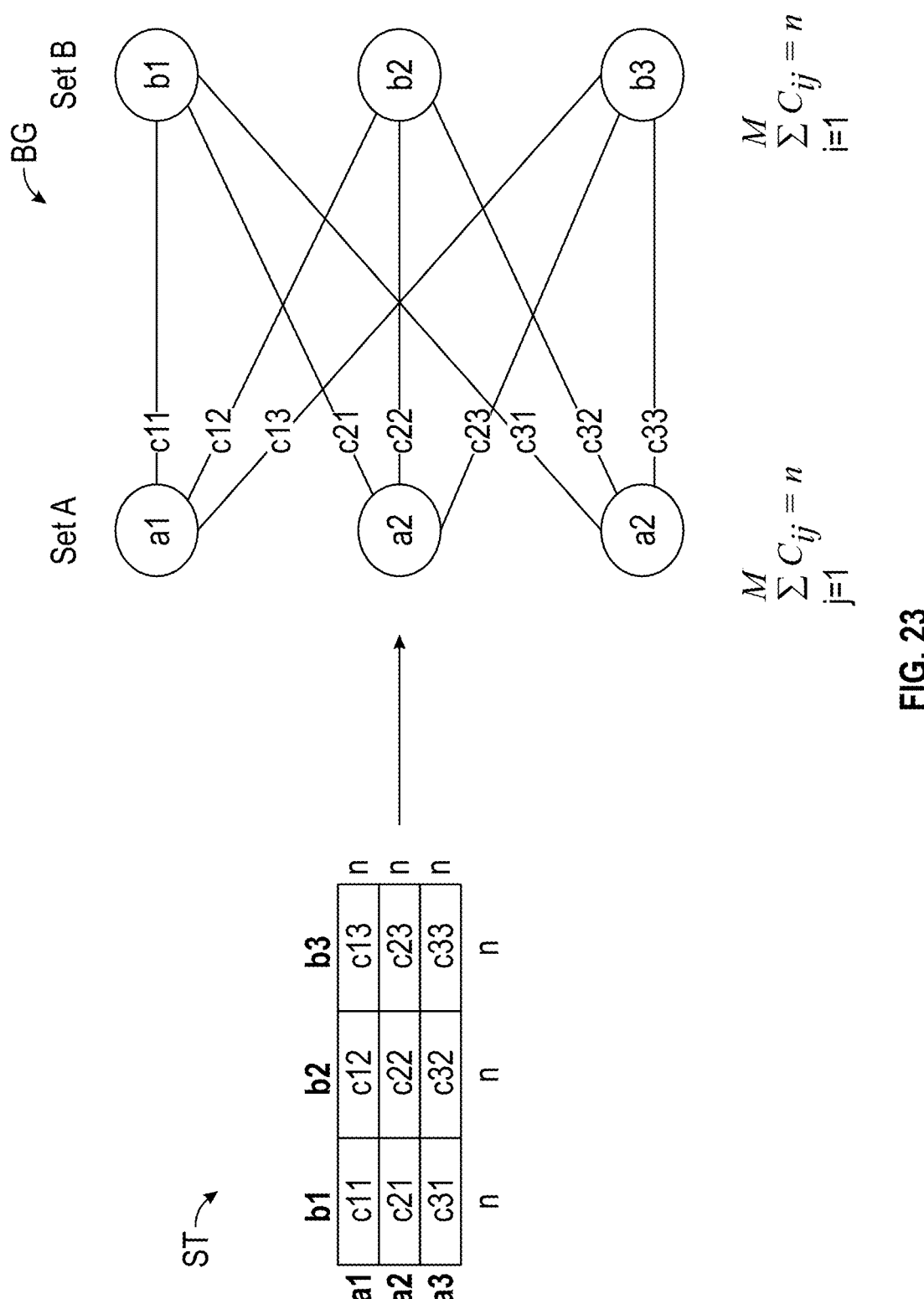
FIG. 23 illustrates a representation of the simplified example schedule table of FIG. 22 as a bipartite graph in accordance with some embodiments of the present disclosure.

FIG. 23 illustrates a representation of the simplified example schedule table of FIG. 22 as a bipartite graph in accordance with some embodiments of the present disclosure. The schedule table ST is shown and the corresponding bipartite graph BG for this schedule table are shown in FIG. 23. Vertices in the bipartite graph BG are circles, with each vertex representing one of the memories in either the first bank or set of memories A or the second bank or set of memories B. There are three memories in each bank A, B in this example, and thus the vertices ai for i=1-3 represent the memories a1, a2, a3 in the set of memories A while the vertices bi for i=1-3 represent the memories b1, b2, b3 in the set of memories B. The bipartite graph BG also includes edges that interconnect the vertices a1-a3 in the set of memories A to the set of memories B. Each of the edges has an associated weight $c_{ij}$, with a weight of zero implying no edge is present. The non-zero edges represent copies between the vertices a1-a3 (i.e., memories a1-a3) in the set of memories A and the vertices b1-b3 (i.e., memories b1-b3) in the set of memories B.

A bipartite graph BG has characteristics that allow it to be utilized to represent the schedule table ST. More specifically, the schedule table ST can be represented as a bipartite graph BG because by definition a bipartite graph has two groups of vertices where edges connect vertices between the two groups but vertices within each group are not connected by edges. A bipartite graph BG has edges $c_{ij}$ between $a_i$ and $b_j$ vertices, no edges between $a_i$ vertices, and no edges between $b_j$ vertices. This is seen in FIG. 23 and follows logically from the representation of each memory in a bank as a vertex in the bipartite graph BG. There are no copies of data elements DE between memories a1-a3 in the first bank of memories A. The same is true of the memories b1-b3 in the second bank of memories B. There are only copies between the memories a and b. Thus, a bipartite graph is suited to represent the schedule table ST.

In the bipartite graph BG, the weight $c_{ij}$ on each edge represents the remaining copies between vertices $a_i$ and $b_j$. A weight $c_{ij}=0$ implies there is no edge between the two associated vertices. The bipartite graph BG has the additional property that the sum of all weights $c_{ij}$ on any $a_i$ vertex is n and the sum of all weights $c_{ij}$ on any $b_j$ vertex is n. This may be written mathematically as $$\sum_{j=1}^{M} c_{ij} = n \text{ and } \sum_{i=1}^{M} c_{ij} = n$$

Representing the scheduling table ST as a bipartite graph opens up the analysis of the scheduling problem presented by the scheduling table (i.e., selecting conflict-free mappings from the table) to all the theory associated with bipartite graphs to being applied to this scheduling property. Moreover, a bipartite graph BG having the above characteristics satisfies Hall's Marriage Theorem, meaning that a perfect matching, which is a matching using all vertices in set A, exists from set A to set B, as will be understood by those skilled in the art.

To find the conflict-free mappings of the schedule table ST according to embodiments of the present disclosure, a modified Edmonds' algorithm is applied to find "perfect matchings" in the bipartite graph BG corresponding to the schedule table, as discussed in relation to FIG. 23. As will be understood by those skilled in the art, Edmonds' algorithm can be used to find a maximal bipartite matching for a bipartite graph BG. Due to the characteristics of the schedule table ST and corresponding bipartite graph BF, the matching identified by Edmonds' algorithm will always be a perfect matching for the corresponding bipartite graph BG. A "perfect matching" means that every vertex a in the set A has an edge (i.e., has been matched) to a vertex b in set B. The edges in the perfect matching correspond to a conflict-free mapping of the schedule table, and thus for a perfect matching the memory copies may be performed between each memory a in set A to a corresponding memory b in set B with no memory conflicts being present. The memory copies may accordingly be performed in parallel for all memories in the system and thus a full throughput of the system.

The operation of the standard Edmunds' algorithm will first be described with reference to FIGS. 24 and 25 to illustrate the identification of perfect matchings in the bipartite graph BG corresponding to the schedule table ST. A modified Edmunds' algorithm is utilized in embodiments of the present disclosure and this modified Edmunds' algorithm will be described in more detail with reference to FIG. 26 after discussion of the standard Edmonds' algorithm.

In operation, the Edmunds' algorithm starts at an unmatched vertex a in set A and finds an augmenting path. An "augmenting path" is a path that starts at an unmatched vertex a in set A and alternates between unmatched and matched edges, terminating at an unmatched vertex b in set B. The augmenting path accordingly follows alternating edges that are not in the current matching and are in the current matching and terminates at an unmatched vertex b in B. The current matching is updated based on the augmenting path, with edges in the path already in the current matching being removed and edges in that are not in the current matching being added. This results in the overall number of matchings in the current matching increasing by one edge or a pair of vertices a, b from set A to set B. The Edmonds' algorithm repeats this process until there are no more augmenting paths in the bipartite graph BG. The weights $c_{ij}$ of edges in the bipartite graph BG, with these weights coming from copy counts in the schedule table ST, are not utilized in the matching performed by Edmonds' algorithm. The Edmonds' algorithm only considers edges that are present in the bipartite graph BG, meaning the edge has a non-zero weight. Edges having a zero weight ($c_{ij}=0$) are not present in the bipartite graph BG and thus are not utilized in Edmonds' algorithm.

FIGS. 24 and 25 illustrate operation of the standard Edmonds' algorithm in identifying perfect matchings in the bipartite graph BG (FIG. 23) corresponding to the schedule table ST. The example of FIGS. 24-26 is different than that of FIG. 23. More specifically, in FIG. 23 the schedule table ST and corresponding bipartite graph BG are for a 3×3 schedule table (i.e., three memories a1-a3, b1-b3). In contrast, in FIG. 24 the schedule table ST (not shown) and corresponding bipartite graph BG are for a 4×4 schedule table (i.e., four memories a1-a4, b1-b4). In FIG. 24, a bipartite graph BG1 as generated from a corresponding schedule table ST (not shown) is shown. All of the edges in this initial bipartite graph BG1 are unmatched (i.e., not in a current matching) and thus represented through dashed lines.

Initially, the algorithm starts with an unmatched vertex a in set A and adds a matched edge to an unmatched vertex b in set B. This is illustrated in bipartite graph BG2 shown in FIG. 24. A matched edge ME is added between unmatched vertex a1 in set A and unmatched vertex b2 in set B. Matched edges are represented through solid lines in the bipartite graphs. The algorithm continues in this matter until there is no unmatched vertex b in set B available for an unmatched vertex a in set A. This is illustrated in the bipartite graph BG3 diagram in FIG. 24. After the initial matched edge ME is added between vertices a1-b2, a second matched edge ME is added between unmatched vertices a2, b3 and a third matched edge ME is added between unmatched vertices a3-b4. The algorithm would next consider the unmatched vertex a4 in set A. As seen in the bipartite graph BG3 in FIG. 24, there is no unmatched vertex b to which a matched edge ME may be added to match to unmatched vertex a4. Only unmatched vertex b1 in set B remains and a matched edge ME between unmatched vertex a4 and unmatched vertex b1 may not be added to the bipartite graph BG3.

FIG. 25 illustrates the operation of Edmonds' algorithm when the situation illustrated bipartite graph BG3 in FIG. 24 arises, namely when perfect matching has not yet been realized and there is no unmatched vertex b available for an unmatched vertex a. This situation is repeated for bipartite graph BG4 in FIG. 25. When the situation arises, Edmonds' algorithm finds or identifies an augmenting path in the bipartite graph BG5. The augmenting path will include alternating dashed lines for the unmatched edges UME and solid lines for the matched edges ME. An augmenting path AP is illustrated in the bipartite graph BG5 of FIG. 25 illustrating the alternating unmatched edges UME and matched edges ME between unmatched vertex a4 and unmatched vertex b1.

Once Edmonds' algorithm has identified the augmenting path AP, the algorithm removes the matched edges ME (i.e., changes each matched edge ME to an unmatched edge UME) in the path and adds the unmatched edges UME to the path (i.e., changes each unmatched edge UME to a matched edge ME). The augmenting path AP after the algorithm has made these changes is illustrated in the bipartite graph BG6 in FIG. 25. The edges in the bipartite graph BG that are not part of the augmenting path AP are not changed by the algorithm in this situation. The unmatched edges UME and matched edges ME in the augmenting path AP are labeled after these changes in the bipartite graph BG3. If the augmenting path AP in bipartite graph BG5 is compared to the augmenting path in bipartite graph BG3 in FIG. 25, it is seen that unmatched edges UME and matched edges ME have been converted relative to one another.

In the example of FIGS. 24 and 25, Edmonds' algorithm has completed after inverting the augmenting path AP in bipartite graph BG6 of FIG. 25. Edmonds' algorithm completes when there are no more augmenting paths AP in the bipartite graph. This is situation is seen to be proper because this final augmenting path AP results in a perfecting matching since every vertex a in the set A has an edge (i.e., has been matched) to a vertex b in set B. Edmunds algorithm must process the repeated multiple times to identify all required conflict-free mapping for the corresponding schedule table ST. The maximum number of iterations of Edmunds' algorithm is $M^2$ to process the entire schedule table ST, where M is the number of augmenting paths AP that need to be found is where a search must be performed for every edge of every vertex. There are 2M vertices and M edges per vertex so the time complexity of the standard Edmunds' algorithm is $M \cdot 2M \cdot M = O(M^3)$. This applies to finding one perfect matching in the schedule table ST and must be repeated up to $M^2$ times to process the schedule table ST. Each iteration of Edmonds' algorithm sets at least one cell C of the schedule table to zero and therefore sets at least one edge in the corresponding bipartite graph to zero. There are there are $M^2$ cells in the schedule table ST and thus the time complexity to process entire schedule table is $O(M^5)$ for the standard Edmonds' algorithm.

FIG. 26 illustrates operation of the modified Edmonds' algorithm according to embodiments of the present disclosure. In the standard Edmonds' algorithm, the process of finding an augmented path AP as described with reference to FIGS. 24 and 25 is repeated a number of times to process the entire schedule table ST. Each iteration of Edmonds' algorithm sets at least one cell C of the schedule table to zero. Accordingly, at least one edge in the corresponding bipartite graph is set to zero each iteration of Edmonds' algorithm. Instead of starting with a new bipartite graph BG corresponding to the most recently modified schedule table ST each iteration of Edmonds' algorithm, the modified Edmonds' algorithm according to embodiments of the present disclosure preserves matchings between solutions after a perfect matching to the schedule table ST has been found. Thus, in a given iteration of Edmonds' algorithm to find an augmenting path AP, the bipartite graph BG corresponding to the perfect match from the prior iteration is modified to remove edges with a weight of 0 resulting from the prior iteration of the algorithm. Recall, each iteration results in at least one cell C in the schedule table ST becoming zero. Thus, in a current iteration of the modified Edmonds' algorithm at least one edge in the corresponding modified schedule table becomes zero. Only these zero edges are removed from the bipartite graph BG corresponding to the perfect matching from the prior iteration of the algorithm. This is now explained in more detail with reference to the example of FIG. 26.

In FIG. 26, a bipartite graph BG7 corresponding to the perfect matching from a prior iteration of Edmonds' algorithm is illustrated. Every vertex a in the set A has an edge (i.e., has been matched) to a vertex b in set B in the perfect matching. After modifying the schedule table ST to account for this perfect matching, at least one cell C in the schedule table will become zero. Each cell C in the schedule table ST that becomes zero corresponds to an edge in the bipartite graph BG7 that becomes zero, meaning the edge is to be removed from the bipartite graph. In the modified Edmonds' algorithm, the bipartite graph BG7 corresponding to the perfect matching is modified to remove these zero edges corresponding to the newly zero one or more cells in the modified schedule table ST.

In the example of FIG. 26, one cell C in the schedule table ST goes to zero as a result of the prior perfect matching and the corresponding one edge in the bipartite graph BG7 is accordingly removed as a result of this prior perfect matching. This is illustrated through the X for the edge between vertices a3, b3 in the bipartite graph BG7. The resulting modified bipartite graph BG8 with this edge removed is shown in FIG. 26. Edmonds' algorithm thereafter operates beginning with this modified bipartite graph BG8 as previously described with reference to FIGS. 24 and 25 to identify another perfect matching. This is illustrated in the bipartite graph BG9 in FIG. 26. The only unmatched vertex in set A is vertex a3 and thus the algorithm begins here to identify an augmenting path AP for this unmatched vertex.

In the modified Edmonds' algorithm, a total of only $M^2$ augmenting paths AP must be found to identify all the perfect matchings for bipartite graph BG and corresponding schedule table ST. This reduces the time complexity for processing the entire table to $M^2 \cdot 2M \cdot M = O(M^4)$.

Figure 27:
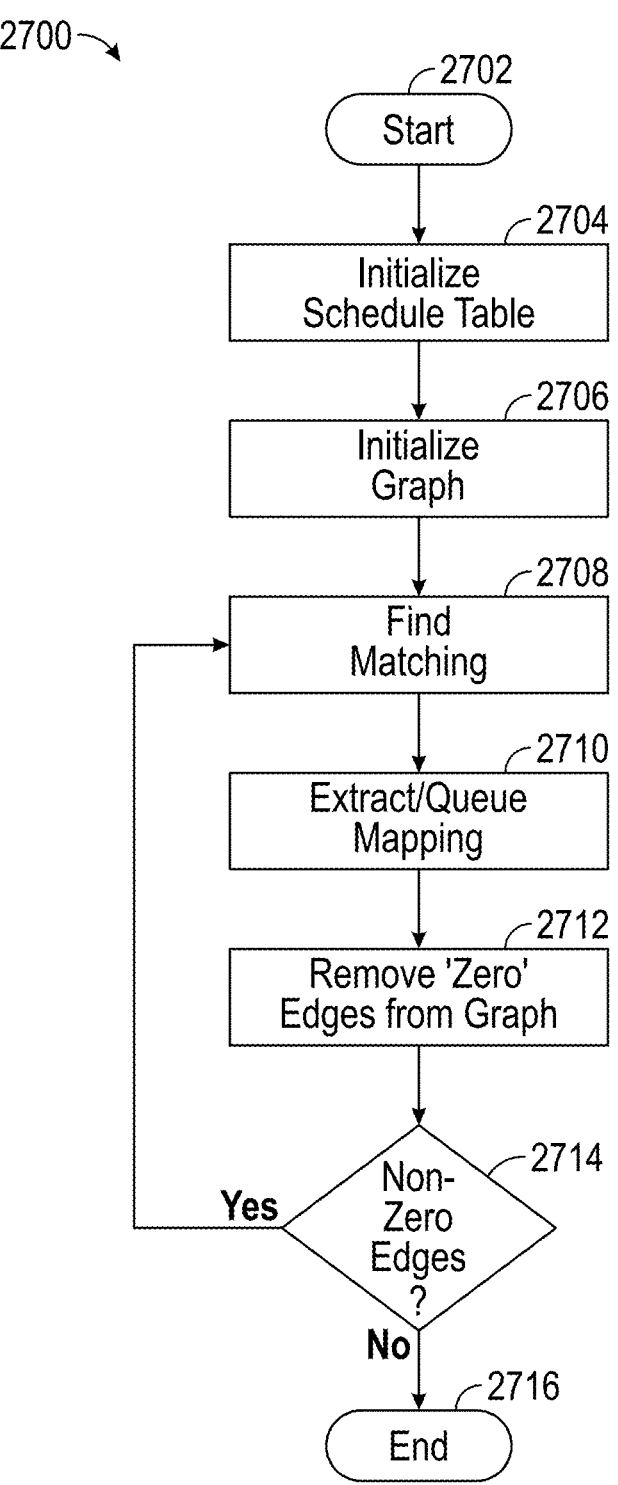
FIG. 27 is a flowchart illustrating a scheduling algorithm for generating a conflict-free mapping of a schedule table according to embodiments of the present disclosure.

FIG. 27 is a flowchart illustrating a scheduling algorithm for generating a conflict-free mapping of a schedule table ST according to embodiments of the present disclosure. The scheduling algorithm 2700 begins at operation 2702 and goes to operation 2704 in which a schedule table ST is initialized, as described above with reference to FIGS. 14-17. The algorithm 2700 then proceeds to operation 2706 and initializes a bipartite graph BG that is based on the schedule table ST, as described above with reference to FIGS. 23 and 24. The algorithm 2700 proceeds from operation 2706 to operation 2708 and finds a perfect matching for the bipartite graph BG, which was described above with reference to FIGS. 24-26. The perfect matching is then utilized to extract a conflict-free mapping from the schedule table ST for a global copy queue, as described above with reference to FIG. 15.

After operation 2710, the algorithm 2700 proceeds to operation 2712 and removes zero edges from the bipartite graph BG in accordance with the modified Edmonds' algorithm being executed according to embodiments of the present disclosure, as described above with reference to FIG. 26. From operation 2712, the algorithm 2700 proceeds to operation 2714 and determines whether there are non-zero edges in the bipartite graph BG. If the determination in operation 2714 is negative, all perfect matchings in the schedule table ST have been found and the algorithm 2700 proceeds to operation 2716 and terminates. When the determination in operation 2714 is positive, indicating there are more perfect matching to be identified in the bipartite graph BG and accordingly more conflict-free mappings to be determined for the schedule table ST, the algorithm 2700 returns to operation 2708 to find another perfect matching for the bipartite graph.

Autonomous driving systems generate occupancy grids, which implement a method to find obstacles in the path of a vehicle containing the system. The occupancy grid is composed of cells representing the space around the vehicle and includes "particles" that represent possible objects in this space. These particles are detected by sensors on the vehicle, each particle existing in some cell in the grid. Particles may move across cells of the grid over time, with a typical occupancy grid including about 8-16 million particles. The particles may cluster around a relatively small number of cells in the occupancy grid. Each cell has a cell ID and updating the occupancy grid typically includes calculating the current cell ID of each particle and sorting particles by cell ID to thereby process particles by cell in the grid. For proper operation of the autonomous driving system, there are millions of data elements in the form of particles that need to be sorted quickly. To perform this sorting, the key is the cell ID and many data elements (particles) may share the same key, which results in results in numerous memory copying conflicts for traditional parallel radix sorting of such a dataset. Embodiments of the present disclosure reduce or eliminate such copying conflicts, reducing the time to perform the required sorting of particles in the occupancy grid.

Figure 28:
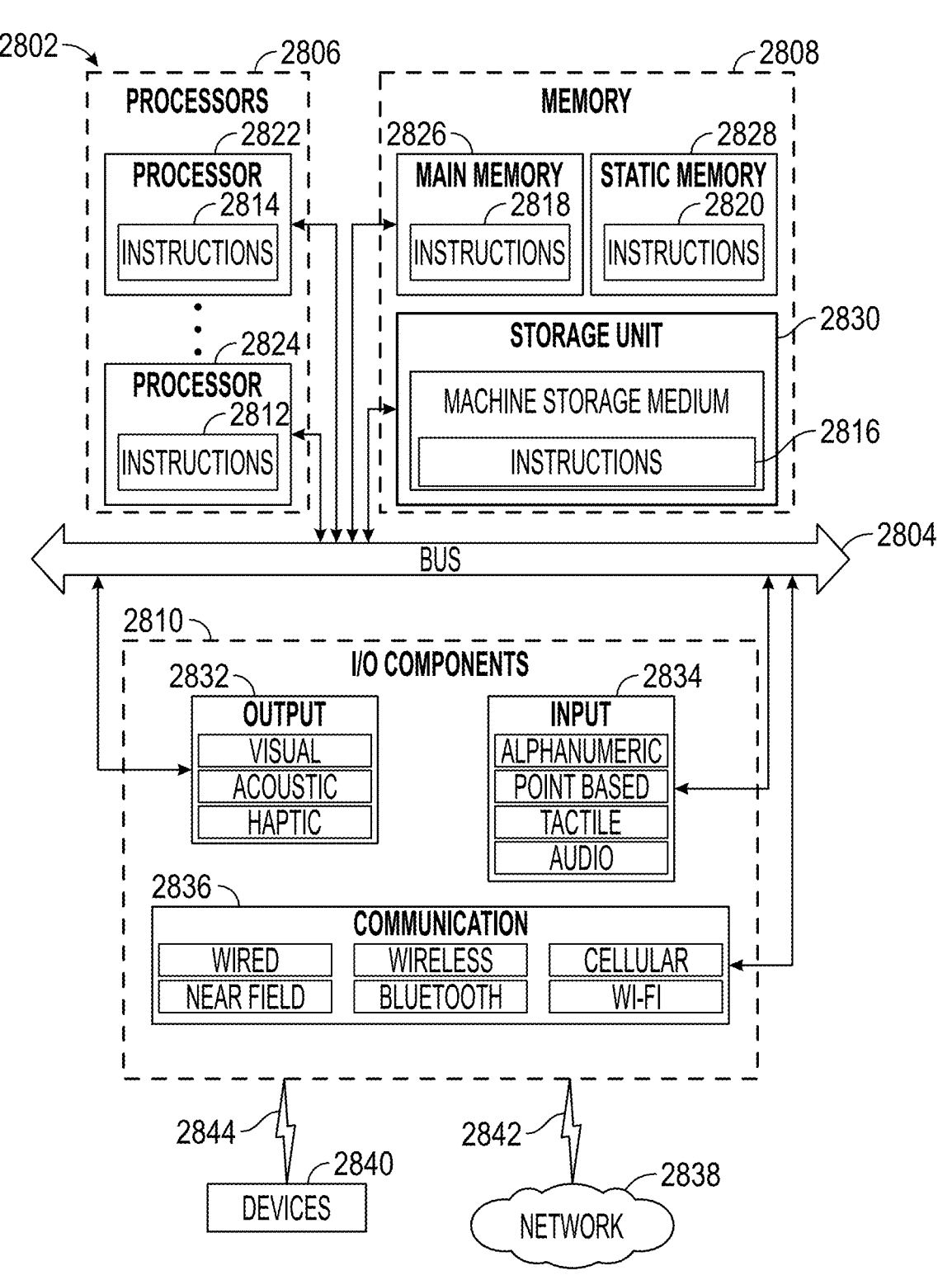
FIG. 28 is a functional block diagram of a computing system for carrying out methods and operations described herein in accordance with some embodiments of the present disclosure.

FIG. 28 is a functional block diagram of a computing system 2800 for executing processes 300, 2000 and other processes described above in accordance with some embodiments of the present disclosure. A machine 2802 is shown in the form of a computer system within which a set of instructions may be executed for causing the machine to perform any one or more of the processes 300, 2000 and other methodologies discussed herein, according to some embodiments of the present disclosure. Specifically, FIG. 28 shows a diagrammatic representation of the machine 2802 in the example form of a computer system. The machine 2802 may include a bus 2804, processors 2806, memory 2808, and I/O components 2810, which may be configured to communicate with each other such as via the bus. The machine 2802 may include instructions 2812-2820 (e.g., software, a program, an application, an applet, an app, or other executable code) for causing the machine 2802 to execute or perform any one or more of the methodologies discussed herein. For example, the instructions 2812-2820 may cause the machine 2802 to execute the processes described in the description above with reference to FIGS. 1-27. The instructions 2812-2820 transform the general, non-programmed machine 2802 into a particular machine 2802 programmed to carry out the described and illustrated functions in the manner described herein. In alternative embodiments, the machine 2802 operates as a standalone device or may be coupled (e.g., networked) to other machines. In a networked deployment, the machine 2802 may operate in the capacity of a server machine or a client machine in a server-client network environment, or as a peer machine in a peer-to-peer (or distributed) network environment. The machine 2802 may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 2812-2820, sequentially or otherwise, that specify actions to be taken by the machine 2802. Further, while only a single machine 2802 is illustrated, the term "machine" shall also be taken to include a collection of machines 2802 that individually or jointly execute the instructions 2812-2820 to perform any one or more of the methodologies discussed herein.

In an example embodiment, the processors 2806 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2822 and a processor 2824 that may execute the instructions 2814, 2812. The term "processor" is intended to include multi-core processors 2806 that may comprise two or more independent processors (sometimes referred to as "cores") that may execute instructions contemporaneously. Although FIG. 28 shows multiple processors 2806, the machine 2802 may include a single processor with a single core, a single processor with multiple cores (e.g., a multi-core processor), multiple processors with a single core, multiple processors with multiple cores, or any combination thereof.

The memory 2808 may include a main memory 2826, a static memory 2828, and a storage unit 2830, both accessible to the processors 2806 such as via the bus 2804. The main memory 2826, the static memory 2828, and the storage unit 2830 store the instructions 2816-2820 embodying any one or more of the processes, methodologies or functions described herein. The instructions 2812-2820 may also reside, completely or partially, within the main memory 2826, within the static memory 2828, within the storage unit 2820, within at least one of the processors 2806 (e.g., within the processor's cache memory), or any suitable combination thereof, during execution thereof by the machine 2802.

The I/O components 2810 may include a wide variety of components to receive input, provide output, produce output, transmit information, exchange information, capture measurements, and so on. The specific I/O components 2810 that are included in a particular machine will depend on the type of machine. For example, portable machines such as mobile phones will likely include a touch input device or other such input mechanisms, while a headless server machine will likely not include such a touch input device. It will be appreciated that the I/O components 2810 may include many other components that are not shown in FIG. 28. The I/O components 2810 are grouped according to functionality merely for simplifying the following discussion and the grouping is in no way limiting. In various example embodiments, the I/O components 2810 may include output components 2832 and input components 2834. The output components 2832 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 2834 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 2810 may include communication components 2836 operable to couple the machine 2802 to a network 2838 or devices 2840 via a coupling 2842 and a coupling 2844, respectively. For example, the communication components 2836 may include a network interface component or another suitable device to interface with the network 2838. In further examples, the communication components 2836 may include wired communication components, wireless communication components, cellular communication components, and other communication components to provide communication via other modalities. The devices 2840 may be another machine or any of a wide variety of peripheral devices (e.g., a peripheral device coupled via a universal serial bus (USB)).

The various memories (e.g., 1016, 1018, 1020, and/or memory of the processor(s) 1006) and/or the storage unit 1020 may store one or more sets of instructions and data structures (e.g., software) embodying or utilized by any one or more of the methodologies or functions described herein. These instructions, when executed by the processor(s) 1006, cause various operations to implement the disclosed embodiments.

As used herein, the terms "machine-storage medium," "device-storage medium," and "non-transitory computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media, ""computer-storage media," and "device-storage media" specifically exclude carrier waves, modulated data signals, and other such media, at least some of which are covered under the term "signal medium" discussed below.

In various example embodiments, one or more portions of the network 2838 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2838 or a portion of the network may include a wireless or cellular network, and the coupling 2842 may be a Code Division Multiple Access (CDMA) connection, a Global System for Mobile communications (GSM) connection, or another type of cellular or wireless coupling. In this example, the coupling 2842 may implement any of a variety of types of data transfer technology, such as Single Carrier Radio Transmission Technology (1×RTT), Evolution-Data Optimized (EVDO) technology, General Packet Radio Service (GPRS)

technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2812 may be transmitted or received over the network 2838 using a transmission medium via a network interface device (e.g., a network interface component included in the communication components 2836) and utilizing any one of a number of well-known transfer protocols (e.g., hypertext transfer protocol (HTTP)). Similarly, the instructions 2812 may be transmitted or received using a transmission medium via the coupling 2844 (e.g., a peer-to-peer coupling) to the devices 2840. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2812 for execution by the machine 2802, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Figure 29:
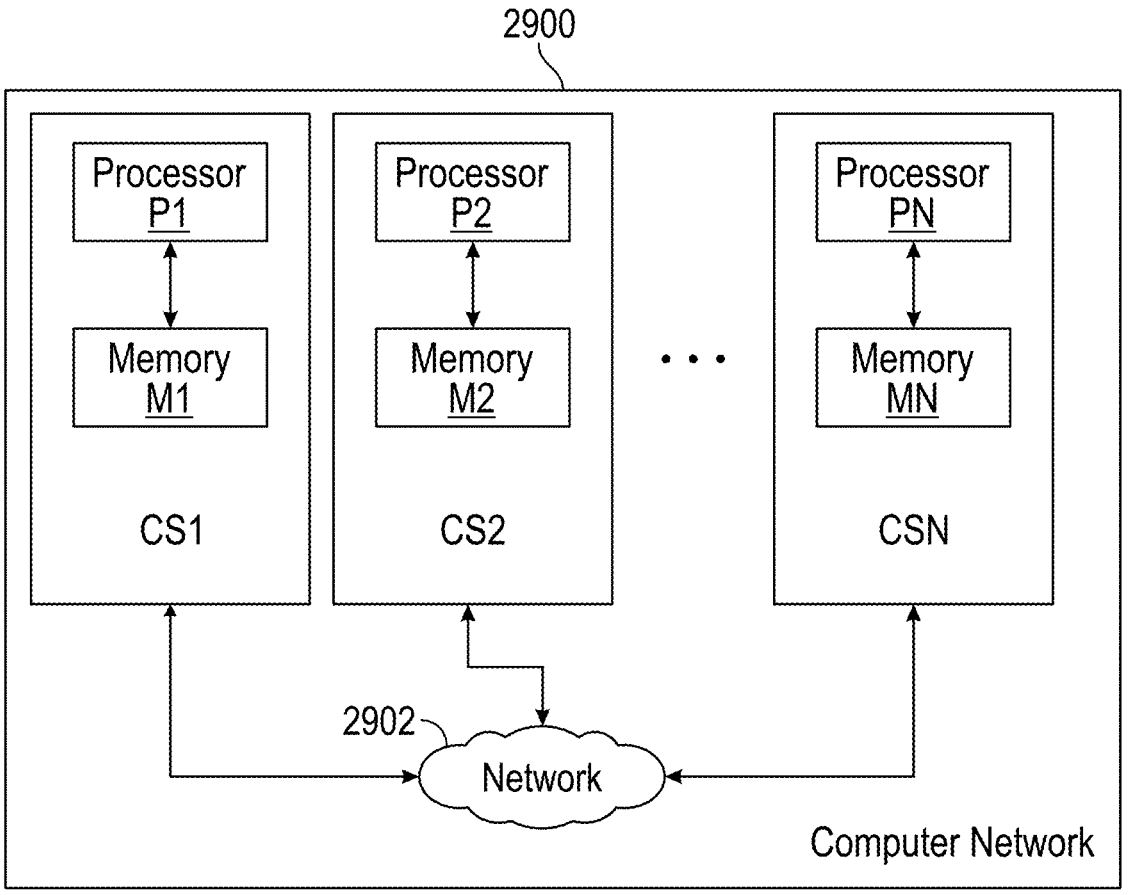
FIG. 29 is a functional block diagram of a distributed computer network for carrying out methods and operations described herein in accordance with some embodiments of the present disclosure.

FIG. 29 is a functional block diagram of a distributed computer network 2900 for carrying out methods and operations described herein in accordance with some embodiments of the present disclosure. The distributed computer network 2900 includes N computer systems CS1-CSN, each computer system including a corresponding processor P1-PN and memory M1-MN. The computer systems CS1-CSN communicate with each over a network 2902, where the network 2902 corresponds to the network 2838 of FIG. 28 in some embodiments. Each of the computer systems CS1-CSN communicates with the network 2902 via a respective coupling 2904-1 to 2904-N, where the specific structure of each coupling will depend on the structures of the computer system CS1-CSN and the network 2902, as described above with reference to FIG. 28 in relation to the coupling 2842. The distributed computer network 2900 corresponds to one embodiment of the sorting system 100 of FIG. 1.

In the embodiment of FIG. 29, the computer systems CS1-CSN implement a conflict-free radix sorting process or algorithm in a distributed manner, with each of the computer systems executing a portion of the algorithm and the computer systems then communicating with each other over the network 2902 to implement the overall sorting algorithm. The embodiment of FIG. 29 may be referred to as a distributed conflict-free parallel radix sorting algorithm or simply "a distributed sorting algorithm" in the following description. In the distributed sorting algorithm, conflicts in the form of communications or "traffic" over the network 2902 to the same computer system CS1-CSN during execution of the algorithm are avoided. This enables the distributed sorting algorithm to be executed more quickly, with execution time being limited by a maximum throughput of the network 2902 but not by communications conflicts over the network 2902.

In operation of the distributed sorting algorithm, each of the computer systems CS1-CSN executes a portion of the overall sorting algorithm. Typically, suitable executable instructions for execution by the processor P1-PN would be stored in the memory M1-MN of each computer system CS1-CSN. Each processor P1-PN executes the instructions in the corresponding memory M1-MN to execute a corresponding portion of the algorithm and to communicate with one or more of the other computer systems CS1-CSN during execution of the algorithm. The portion of the algorithm executed by each computer system CS1-CSN may vary among the computer systems, and thus the executable instructions in each memory M1-MN need not be identical. The data elements DE of the dataset being sorted would be typically be divided among the computer systems CS1-CSN, with a portion of the dataset being stored in each of the memories M1-MN. For example, the dataset would typically be divided into N substantially equal portions, each portion stored in a respective one of the memories M1-MN.

In operation, each computer system CS1-CSN executes a portion of the distributed sorting algorithm to generate a local histogram for the data elements DE of the portion of the dataset stored in the memory M1-MN of the computer system. Each computer system CS1-CSN executes the corresponding portion of the algorithm in parallel, generating the local histograms in parallel. This local sorting of the corresponding data elements DE on each computer system CS1-CSN may be executed without any communications over the network 2902 since each computer system is merely locally sorting the data elements DE stored in the corresponding memory M1-MN.

Once each computer system CS1-CSN has generated the local histogram for the corresponding data elements DE, the computer system will send the local histogram over the network 2902 to a designated one of the computer systems CS1-CSN. Upon receipt of the local histograms from all the other computer systems CS1-CSN, the designated one of the computer systems CS1-CSN executes instructions for calculating a schedule for a copy queue and for calculating broadcast mappings for communicating data elements DE among the computer systems CS1-CSN over the network 2902 to properly sort the dataset in the memories M1-MN of the computer systems CS1-CSN. The generated broadcast mappings provide conflict-free mappings to enable communication of the data elements DE among the computer systems CS1-CSN over the network 2902 without communications conflicts occurring on the network. A communications conflict may occur, for example, where computer system CS1 attempts to send data including one or more data elements DE to computer system CS3 while computer system CS2, at the same time, also attempts to send data to computer system CS3. These types of communications conflicts on the network 2902 are avoided with the distributed sorting algorithm.

The distributed sorting algorithm prevents communications conflicts on the network 2902 in a manner analogous to the avoidance of memory copying conflicts that are avoided by embodiments of conflict-free parallel radix sorting algorithms as described above with reference to FIGS. 1-28, such as the conflict-free parallel radix sorting algorithm 300 of FIG. 3. Thus, where the conflict-free parallel radix sorting algorithms as described above with reference to FIGS. 1-28 generate a schedule table ST (FIGS. 21, 22) to provide a conflict-free mappings CFM (FIG. 22) among the memories $A_1$-$A_4$, $B_1$-$B_4$, the distributed sorting algorithm generates a schedule table ST that is used to generate a copy queue to provide conflict-free mappings of communications of data elements DE over the network 2902. The distributed sorting algorithm operates in a manner analogous to the description above for the conflict-free sorting algorithms of FIGS. 1-28 to generate the schedule table ST and copy queue that provides conflict-free mappings for communications over the network 2902.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

Each of the non-limiting aspects described herein can stand on its own or can be combined in various permutations or combinations with one or more of the other aspects or other subject matter described in this document.

The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a claim are still deemed to fall within the scope of that claim. Moreover, in the following aspects, the terms "first," "second," and "third," etc., are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A method comprising:
sorting data elements locally in each of a first plurality of memories, each of the data elements including a key and data, by performing operations comprising:
performing a counting sort on the data elements in each of the first plurality of memories, the counting sort including:
generating a count histogram for each of the first plurality of memories, each count histogram based on the keys of the data elements in the memory, and sorting the data elements in each of the first plurality of memories based on the count histogram for the memory;
generating, based on the count histograms for each of the first plurality of memories, a schedule table that provides a plurality of conflict-free mappings of the data elements from the first plurality of memories to a second plurality of memories; and
performing, according to the schedule table, conflict-free copying in parallel of the sorted data elements from the first plurality of memories to the second plurality of memories.

2. The method of claim 1, wherein the generating of the schedule table comprises executing a modified Edmonds' algorithm to find the conflict-free mappings.

3. The method of claim 2, wherein the modified Edmond's algorithm comprises:
modifying a bipartite graph to remove edges with a weight of zero, the bipartite graph providing a perfect matching and having been generated in a prior iteration of Edmonds' algorithm; and
finding a subsequent perfect matching based on the modified bipartite graph.

4. The method of claim 3, further comprising:
iteratively repeating the modifying of the bipartite graph and the finding of a subsequent perfect matching until the modified bipartite graph has no non-zero edges.

5. The method of claim 3, wherein the generating of the schedule table further comprises generating a global copy queue including the plurality of conflict-free mappings, each conflict-free mapping corresponding to a perfect matching of the bipartite graph.

6. The method of claim 5, wherein the performing, according to the schedule table, of the conflict-free copying in parallel of the data elements comprises copying the sorted data elements from the first plurality of memories to the second plurality of memories according to the plurality of conflict-free mappings of the global copy queue.

7. The method of claim 5, wherein:
the first plurality of memories and the second plurality of memories each comprise a number M of memories; and
the method further comprises generating a boundary offset table including boundary offset for M–1 boundaries between the memories.

8. The method of claim 1, wherein the sorting of the data elements in each of the memories in the first plurality of memories and the generating of the schedule table are executed in parallel.

9. A system comprising:
at least one processor; and
at least one memory storing instructions that, when executed by the processor, cause the system to perform operations comprising:
sorting data elements locally in each of a first plurality of memories, each of the data elements including a key and data, by performing steps comprising:
performing a counting sort on the data elements in each of the first plurality of memories, the counting sort including:
generating a count histogram for each of the first plurality of memories, each count histogram based on the keys of the data elements in the memory, and
sorting the data elements in each of the first plurality of memories based on the count histogram for the memory;

generating, based on the count histograms for each of the first plurality of memories, a schedule table that provides a plurality of conflict-free mappings of the data elements from the first plurality of memories to a second plurality of memories; and performing, according to the schedule table, conflict-free copying in parallel of the sorted data elements from the first plurality of memories to the second plurality of memories.

10. The system of claim 9, wherein the generating of the schedule table further comprises generating a global copy queue including the plurality of conflict-free mappings, each conflict-free mapping corresponding to a perfect matching of a bipartite graph.

11. The system of claim 10, wherein the performing, according to the schedule table, of the conflict-free copying in parallel of the data elements comprises copying the sorted data elements from the first plurality of memories to the second plurality of memories according to the plurality of conflict-free mappings of the global copy queue.

12. The system of claim 9, wherein:

the first plurality of memories and the second plurality of memories each comprise a number M of memories; and the operations further comprise generating a boundary offset table including boundary offset for M−1 boundaries between the memories.

13. The system of claim 9, wherein the sorting of the data elements in each of the memories in the first plurality of memories and the generating of the schedule table are executed in parallel.

14. The system of claim 9, wherein the generating of the schedule table comprises executing a modified Edmonds' algorithm to find the conflict-free mappings.

15. The system of claim 14, wherein the modified Edmond's algorithm comprises:

modifying a bipartite graph to remove edges with a weight of zero, the bipartite graph providing a perfect matching and having been generated in a prior iteration of Edmonds' algorithm; and finding a subsequent perfect matching based on the modified bipartite graph.

16. A non-transitory computer-storage medium that stores instructions that, when executed by one or more hardware processors, cause the one or more hardware processors to perform operations comprising:

sorting data elements locally in each of a first plurality of memories, each of the data elements including a key and data, by performing steps comprising:

performing a counting sort on the data elements in each of the first plurality of memories, the counting sort including:

generating a count histogram for each of the first plurality of memories, each count histogram based on the keys of the data elements in the memory, and sorting the data elements in each of the first plurality of memories based on the count histogram for the memory;

generating, based on the count histograms for each of the first plurality of memories, a schedule table that provides a plurality of conflict-free mappings of the data elements from the first plurality of memories to a second plurality of memories; and performing, according to the schedule table, conflict-free copying in parallel of the sorted data elements from the first plurality of memories to the second plurality of memories.

17. The non-transitory computer-storage medium of claim 16, wherein the generating of the schedule table further comprises generating a global copy queue including the plurality of conflict-free mappings, each conflict-free mapping corresponding to a perfect matching of a bipartite graph.

18. The non-transitory computer-storage medium of claim 17, wherein the performing, according to the schedule table, of the conflict-free copying in parallel of the data elements comprises copying the sorted data elements from the first plurality of memories to the second plurality of memories according to the plurality of conflict-free mappings of the global copy queue.

19. The non-transitory computer-storage medium of claim 16, wherein:

the first plurality of memories and the second plurality of memories each comprise a number M of memories; and the operations further comprise generating a boundary offset table including boundary offset for M−1 boundaries between the memories.

20. The non-transitory computer-storage medium of claim 16, wherein the sorting of the data elements in each of the memories in the first plurality of memories and the generating of the schedule table are executed in parallel.

* * * * *